United States Patent  
Koga et al.

(10) Patent No.: US 8,331,395 B2  
(45) Date of Patent: Dec. 11, 2012

(54) COMMUNICATION APPARATUS, COMMUNICATION SYSTEM, AND COMMUNICATION CONTROL METHOD

(75) Inventors: Hisao Koga, Fukuoka (JP); Nobutaka Kodama, Fukuoka (JP)

(73) Assignee: Panasonic Corporation, Osaka (JP)

( * ) Notice: Subject to any disclaimer, the term of this patent is extended or adjusted under 35 U.S.C. 154(b) by 232 days.

(21) Appl. No.: 12/057,204

(22) Filed: Mar. 27, 2008

(65) Prior Publication Data

US 2008/0240143 A1 Oct. 2, 2008

(30) Foreign Application Priority Data

Mar. 27, 2007 (JP) ................................. 2007-082197

(51) Int. Cl.
*H04L 12/413* (2006.01)
(52) U.S. Cl. ........................................................ 370/445
(58) Field of Classification Search .................... 370/445
See application file for complete search history.

(56) References Cited

U.S. PATENT DOCUMENTS

| 4,519,081 | A | 5/1985 | Sugie | |
|---|---|---|---|---|
| 6,735,635 | B1 * | 5/2004 | Rodriquez et al. | 709/248 |
| 6,868,072 | B1 * | 3/2005 | Lin et al. | 370/276 |
| 7,688,864 | B2 * | 3/2010 | Zeng et al. | 370/513 |
| 2005/0220230 | A1 | 10/2005 | Fukuda | |
| 2006/0146943 | A1 | 7/2006 | Kasher | |
| 2006/0182079 | A1 | 8/2006 | Yang | |
| 2006/0209892 | A1 * | 9/2006 | MacMullan et al. | 370/468 |
| 2007/0133473 | A1 | 6/2007 | Takagi | |
| 2007/0195956 | A1 * | 8/2007 | Gavette | 380/277 |

FOREIGN PATENT DOCUMENTS

| JP | 58-3372 | 1/1983 |
|---|---|---|
| JP | 2005-012275 | 1/2005 |
| JP | 2005-295085 | 10/2005 |
| JP | 2007-143905 | 5/2007 |

OTHER PUBLICATIONS

International Search Report dated Oct. 21, 2008.
Japanese Office Action dated Jan. 18, 2011.

* cited by examiner

*Primary Examiner* — Huy D Vu
*Assistant Examiner* — Adnan Baig
(74) *Attorney, Agent, or Firm* — Dickinson Wright PLLC

(57) ABSTRACT

A communication apparatus which performs a carrier detection and is connected to a transmission line includes: a carrier detecting unit which detects a first preamble signal for the carrier detection and a second preamble signal for the carrier detection; a comparing unit which compares carrier detecting results obtained by the carrier detecting unit; and a control unit which controls at least one of a symbol length of the first preamble signal and a symbol length of the second preamble signal based upon a comparison result obtained by the comparing unit.

27 Claims, 14 Drawing Sheets

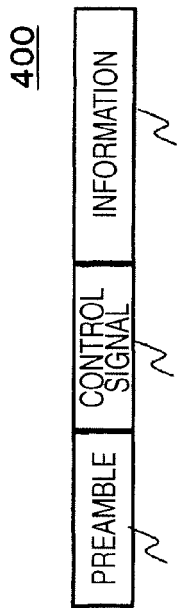
FIG. 4A
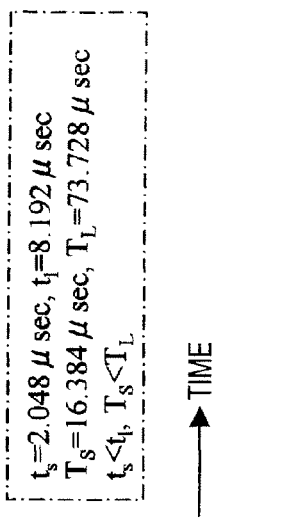
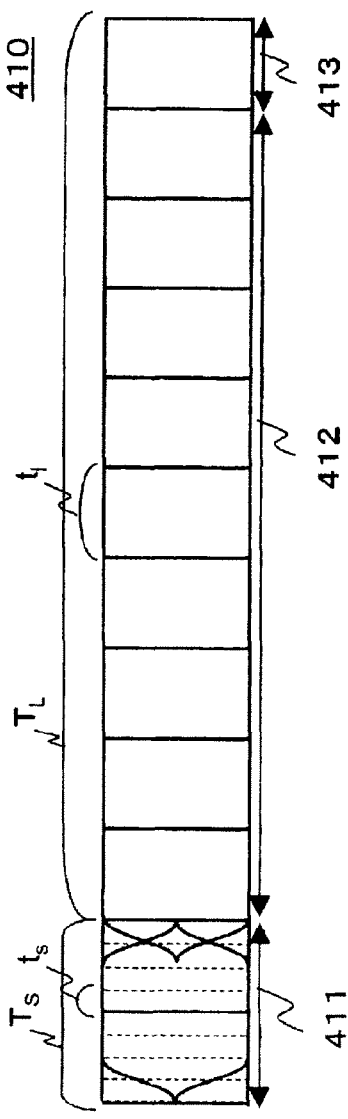
FIG. 4B
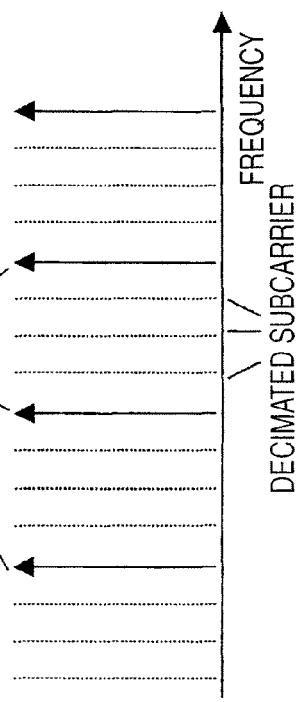
FIG. 4C
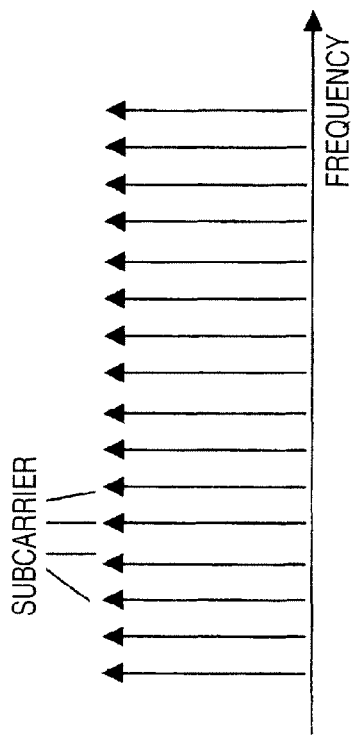
FIG. 4D

COMMUNICATION APPARATUS, COMMUNICATION SYSTEM, AND COMMUNICATION CONTROL METHOD

BACKGROUND

The present invention relates to a communication apparatus, a communication system, and a communication control method.

In communications with employment of wireless LANs and power line communications using power lines, the CSMA/CA (Carrier Sense Multiple Access with Collision Avoidance) system has been employed as one of packet collision avoiding methods.

In the CSMA/CA method, one communication apparatus which tries to commence a transmission checks whether or not signals transmitted by other communication apparatuses are present on a transmission line (concretely speaking, whether or not carriers are present which are utilized in communication on transmission line) in order that the first-mentioned communication apparatus can perform the transmission at this time. When the carriers are detected, the communication apparatus waits the transmission until the communications executed by other communication apparatuses are accomplished. After the communication apparatus has confirmed the accomplishments of the communications by other communication apparatuses, the first-mentioned communication apparatus further waits the transmission for a time calculated by adding an IFS (Inter Frame Space) time to a back off time determined at random, and then, commences the transmission after confirming that other communication apparatuses are not operated under communication by detecting carriers.

A back off time implies such a time required by that a communication apparatus which tries to commence a transmission monitors such a condition that other communication apparatuses are not operated under transmissions. FIG. 16 is a diagram for explaining the back off time. In FIG. 16, time periods 1610A, 1620A, 1630A, - - - , among signal frames 1610, 1620, 1630, - - - , which have been transmitted on a transmission line by any of communication apparatuses represent back off times. Back off times are sequentially determined by multiplying, for example, random values by a unit time (will be referred to as "unit back off time" hereinafter), while the random values can be determined by producing random numbers. There are many possibilities that this unit back off time is determined on the basis of such a time required for detecting a signal frame by a receiving apparatus (this time requires that, for instance, PHY layer detects signal frame, and MAC layer grasps detection of signal frame).

FIG. 17 is a diagram for representing one example as to a signal frame which is utilized when a conventional communication apparatus performs a communication. A signal frame 1700 has been constituted by a detection preamble field 1710, a synchronization preamble field 1720, a control field 1730, and an information field 1740. The detection preamble field 1710 contains 10 pieces of continuous detection preambles for detecting carriers. The synchronization preamble field 1720 contains signals (T1, T2) for synchronizations. The control field 1730 contains a signal (SIGNAL) for performing a communication control. The information field 1740 contains actual data (Data 1, Data 2, - - - ).

In FIG. 17, since a time length (t1 to t10) of one detection preamble is 0.8 μsec., a time length of all of the detection preambles is 8 μsec. Now, in such a case that a time required for that a receiving apparatus detects a signal frame is, for example, 8 μsec., 8 μsec. may be employed as a unit back off time. In this case, a length of a back off time becomes "8 μsec. X random value (integer)." It should be noted that a time required for that the receiving apparatus detects the signal frame is directly proportional to a symbol length used in a communication. This reason is given as follows: That is, in order that the receiving apparatus detects the signal frame within the shortest time period, a time defined by (1 symbol+ processing delay) is required.

Conventionally, while a symbol length is a fixed length, the symbol length must be made long in order to firmly detect a carrier. On the other hand, if the symbol length is made longer, then the preamble length becomes long and also the back off time becomes long. As a result, there is no way to avoid that a transmission efficiency is deteriorated.

It should be understood that in order to improve transmission efficiencies of systems for performing communications by utilizing the CSMA/CA method, there are such communication systems which adjust upper limit values of back off times in response to available conditions of frequency bands under use with reference to, for example, JP-A-2005-12275.

SUMMARY

An embodiment as described below has been made to solve the above-described problems, and therefore, has an object to provide a communication apparatus, a communication system, and a communication control system, capable of detecting a carrier in a stable manner, and also, capable of performing a communication in a higher transmission efficiency.

A communication apparatus according to the embodiment as described below is such a communication apparatus which performs a carrier detection and is connected to a transmission line, including: a carrier detecting unit which detects a first preamble signal for the carrier detection and a second preamble signal for the carrier detection; a comparing unit which compares carrier detecting results obtained by the carrier detecting unit; and a control unit which controls at least one of a symbol length of the first preamble signal and a symbol length of the second preamble signal based upon a comparison result obtained by the comparing unit.

While employing the comparison result between the carrier detection result of the first preamble signal and the carrier detection result of the second preamble signal, at least one of the symbol length of the first preamble signal and the signal length of the second preamble signal is controlled. As a result, the symbol length of the first preamble signal and the symbol length of the second preamble signal become suitable lengths for the condition for the transmission line, so that the unit back off time of the communication apparatus becomes a minimum necessary time. As a consequence, the communication operation can be carried out in a higher transmission efficiency.

Also, a communication control method according to the embodiment as described below includes: carrying out a carrier detection by employing a first preamble signal for the carrier detection and a second preamble signal for the carrier detection; comparing a carrier detecting result of the carrier detection; and controlling at least one of a symbol length of the first preamble signal and a symbol length of the second preamble signal based upon a comparison result of the carrier detecting result.

While employing the comparison result between the carrier detection result of the first preamble signal and the carrier detection result of the second preamble signal, at least any one of the symbol length of the first preamble signal and the symbol length of the second preamble signal is controlled. As a result, the symbol length of the first preamble signal and the symbol length of the second preamble signal can become symbol lengths suitable for the condition of the transmission line, so that the unit back off time of the communication apparatus becomes a minimum necessary time. Accordingly, the communication operation can be carried out in the higher transmission efficiency.

Also, an integrated circuit according to the embodiment as described below includes: a carrier detecting unit which detects a first preamble signal for the carrier detection and a second preamble signal for the carrier detection; a comparing unit which compares carrier detecting results obtained by the carrier detecting unit; and a control unit which controls at least one of a symbol length of the first preamble signal and a symbol length of the second preamble signal based upon a comparison result made by the comparing unit.

While employing the comparison result between the carrier detection result of the first preamble signal and the carrier detection result of the second preamble signal, at least any one of the symbol length of the first preamble signal and the symbol length of the second preamble signal is controlled. As a result, the symbol length of the first preamble signal and the symbol length of the second preamble signal can become symbol lengths suitable for the condition of the transmission line, so that the unit back off time of the communication apparatus becomes a minimum necessary time. As a result, such an integrated circuit can be provided by which the communication operation can be carried out in the higher transmission efficiency.

In accordance with the communication apparatus, the communication system and the communication control method as described above, the carriers can be detected in the stable manner, and the transmission efficiency can be improved. For instance, when a condition of a transmission line is better, a back off time can be shortened, whereas when a condition of the transmission line is deteriorated, a back off time can be prolonged.

BRIEF DESCRIPTION OF THE DRAWINGS

The above objects and advantages will become more apparent by describing in detail a preferred exemplary embodiment thereof with reference to the accompanying drawings, wherein like reference numerals designate like or corresponding parts throughout the several views, and wherein:

FIG. 4 is a diagram for explaining one example as to a signal frame according to the embodiment;

DETAILED DESCRIPTION

Now, a description will be made of embodiments with reference to drawings, while a power line communication for performing a communication by utilizing a power line is exemplified. However, the embodiment is not limited only to the power line communication, but may be applied to other communications such as wireless communication LANs.

Figure 1:
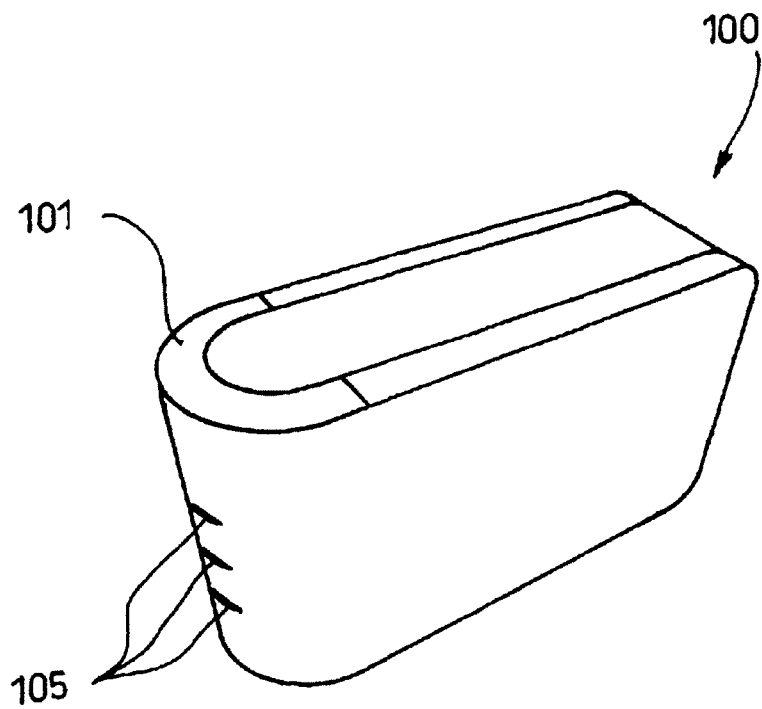
FIG. 1 is a perspective view for showing a concrete example of an outer appearance as to a front plane of a PLC modem according to an embodiment.
Figure 2:
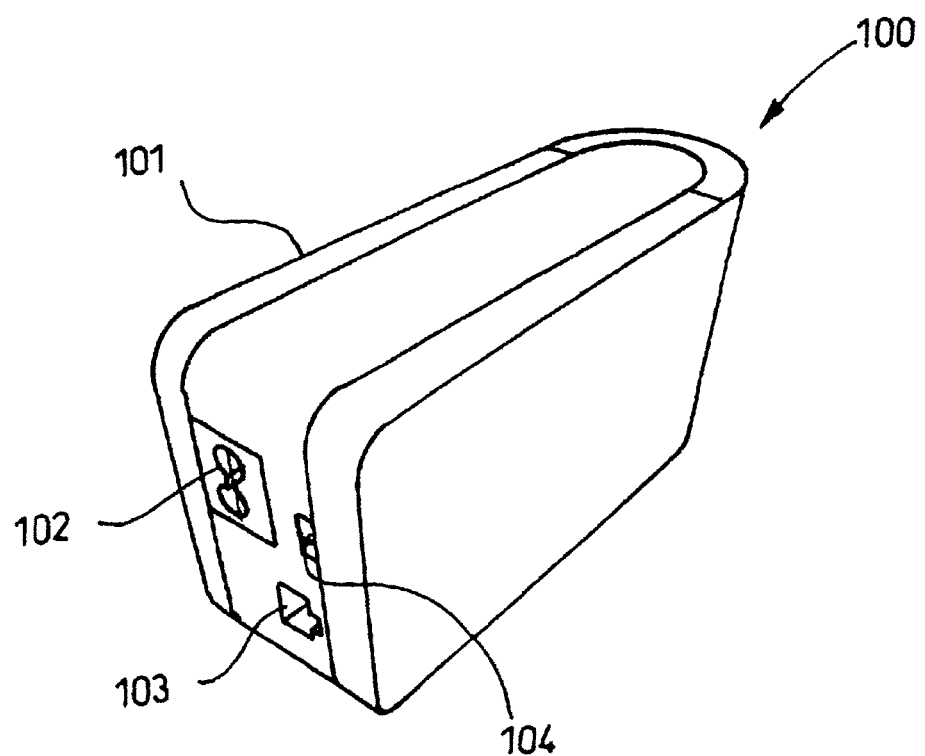
FIG. 2 is a perspective view for showing a concrete example of an outer appearance as to a rear plane of the PLC modem according to the embodiment.

FIG. 1 is an outer appearance perspective view for representing a front plane of a PLC (Power Line Communication) modem 100 corresponding to one example of a power line communication apparatus. FIG. 2 is an outer appearance perspective view for showing a rear plane of the PLC modem 100. While the PLC modem 100 shown in FIG. 1 contains a housing 101, a display unit 105 such as an LED (Light Emitting Diode) is provided on a front plane of the housing 101, as represented in FIG. 1.

Also, as indicated in FIG. 2, a power supply connector 102, a LAN (Local Area Network) modular jack such as PJ45, and a selecting switch 104 for selecting an operation mode are provided on the rear plane of the housing 101. A power supply cable (not shown) is connected to the power supply connector 102, and a LAN cable (now shown) is connected to the modular jack 103. It should be noted that a D-sub (D-subminiature) connector may be provided on the PLC modem 100 so as to connect a D-sub cable (not shown) to the D-sub connector.

It should also be noted that although the PLC modem 100 is indicated as one example of the "power line communication apparatus", an electric appliance which contains the PLC modem 100 may be alternatively employed. As the above-described electric appliance, for example, there are domestic electric appliances known as a television, a telephone, a video deck, and a set-top box; and business machines such as a personal computer, a facsimile, and a printer.

Also, the PLC modem 100 is connected to a power line 340, and constitutes a power line communication system 1000 in combination with another PLC modem 100. The power line communication system 1000 is one example as to the "communication system."

Figure 3:
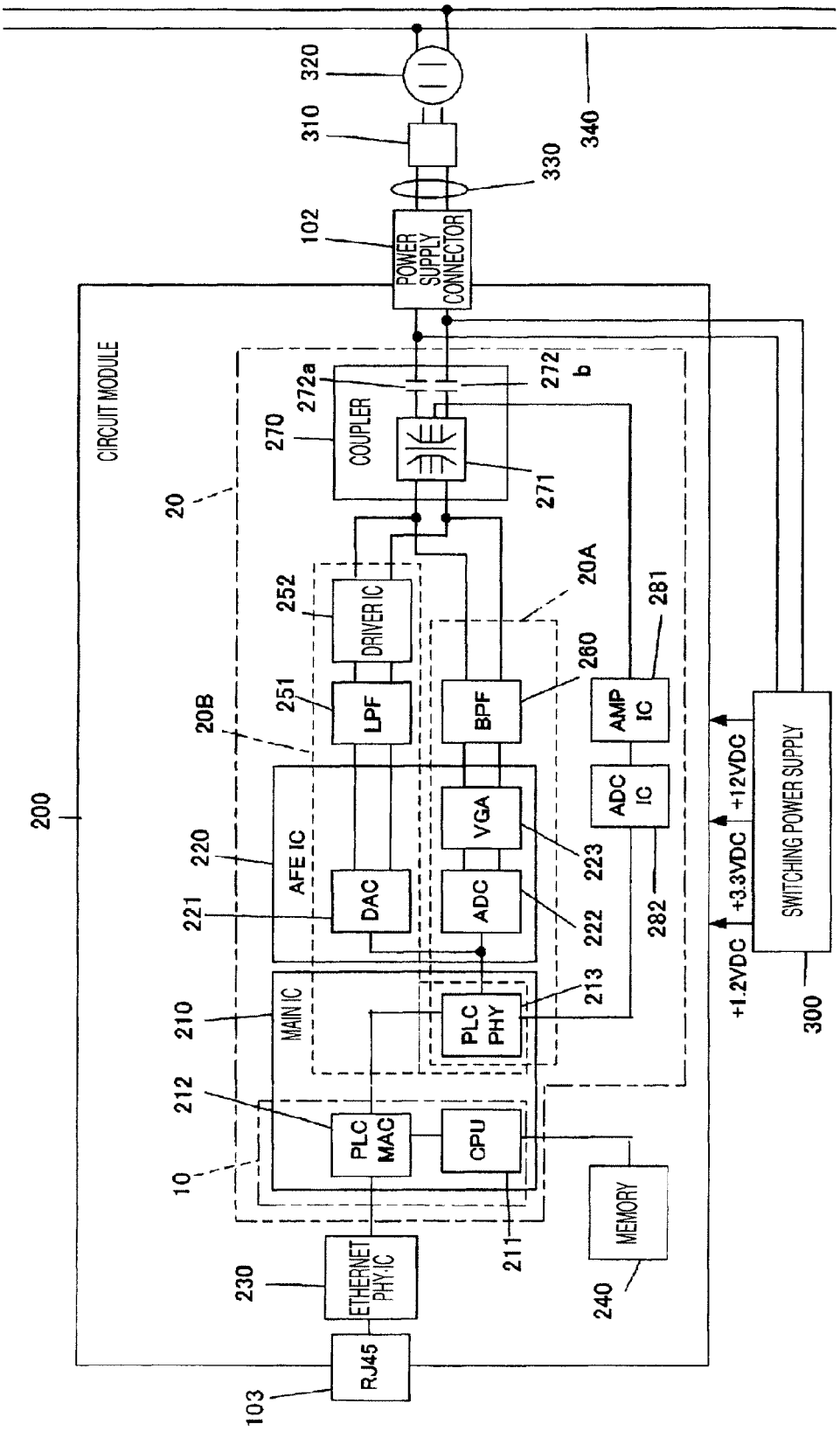
FIG. 3 is a block diagram for indicating one example as to a hardware structure of the PLC modem according to the embodiment.

Next, FIG. 3 indicates an example as to hardware of the PLC modem 100. The PLC modem 100 contains a circuit module 200 and a switching power supply 300. The switching power supply 300 supplies various sorts of voltages (for example, +1.2V, +3.3V, and +12V) to the circuit module 200, and is arranged by containing, for example, a switching transformer and a DC-to-DC converter, which are not shown.

In the circuit module 200, a main IC (Integrated Circuit) 210, an AFE•IC (Analog Front End•Integrated Circuit) 220, an Ethernet PHY•IC (Physical Layer•Integrated Circuit) 230, a memory 240, a low-pass filter (LPF) 251, a driver IC 252, a band-pass filter (BPF) 260, a coupler 270, an AMP (amplifier) IC 281, and an ADC (A/D converting) IC 282 are provided.

Both the switching power supply 300 and the coupler 270 are connected to the power supply connector 102, and further, are connected via a power supply cable 330, a power supply plug 310, and an outlet 320 to the power line 340. It should also be noted that the main IC 210 functions as a control circuit for performing a power line communication.

The main IC 210 is constituted by a CPU (Central Processing Unit) 211, a PLC•MAC (Power Line Communication•Media Access Control layer) block 212, and a PLC•PHY (Power Line Communication•Physical layer) block 213.

The CPU 211 mounts a 32-bit RISC (Reduced Instruction Set Computer) processor. The PLC•MAC block 212 manages MAC layers (Media Access Control layers) of transmission/reception signals, and the PLC•PHY block 213 manages PHY layer (Physical layers) of transmission/reception signals.

The AFE•IC 220 is arranged by a D/A converter (DAC) 221, an A/D converter (ADC) 222, and a variable gain amplifier (VGA) 223. The coupler 270 is constituted by a coil transformer 271 and coupling capacitors 272a and 272b.

It should also be understood that the CPU 211 controls operations of the PLC•MAC 212 and the PLC•PHY block 213, and also, controls the entire operations of the PLC modem 100 by utilizing data stored in the memory 240.

Briefly speaking, a communication operation by the PLC modem 100 is carried out in accordance with the below-mentioned manner. Data entered from the modular jack 103 is transferred via the Ethernet PHY•IC 230 to the main IC 210, and the transferred data is processed by a digital signal processing operation, so that a digital transmission signal is produced. The produced digital transmission signal is converted into an analog signal by the D/A converter (DAC) 221 of the AFE•IC 220, and then, the converted analog signal is outputted via the low-pass filter 251, the driver IC 252, the coupler 270, the power supply connector 102, the power supply cable 330, the power supply plug 310, and the outlet 320 to the power line 340.

A signal received from the power line 340 is transferred via the coupler 270 to the band-pass filter 260, and then, a gain of the filtered analog signal is controlled by the variable gain amplifier (VGA) 223 of the AFE•IC 220, and thereafter, the gain-controlled analog signal is converted into a digital signal by the A/D converter (ADC) 222. Then, the converted digital signal is transferred to the main IC 210, and the transferred digital signal is processed by the digital signal processing operation so as to be converted into digital data. The converted digital data is outputted via the Ethernet PHY•IC 230 from the modular jack 103.

Also, a description is made of functions of the PLC modem 100. That is, the CPU 211 and the PLC•MAC function as a control unit 10. Further, the PLC•PHY block 213, the AFE•IC 220, the LPF 251, the driver IC 252, the BPF 260, and the coupler 270 function as a communication unit 20.

The control unit 10 performs various sorts of control operations, and further, executes control operations so as to adjust a symbol length of a short preamble, and a unit back off time for determining a back off time. While the symbol length of the short preamble and the unit back off time are uniquely determined, the control unit 10 adjusts the unit back off time based upon the symbol length of the short preamble, and adjusts the symbol length of the short preamble based upon the unit back off time. It should also be understood that the control unit 10 contains various functions as a "comparing unit", a "unit back off time setting unit", a "judging unit", and a "stopping unit."

While the communication unit 20 is communicated with other PLC modems 100 provided on a power line network, the communication unit 20 has a signal receiving unit 20A and a signal transmitting unit 20B. The signal receiving unit 20A receives signals transmitted from other PLC modems 100. The signal transmitting unit 20B transmits signals to other PLC modems 100. It should also be noted that the communication unit 20 contains the control unit 10, and has functions as a "subcarrier number control unit" and a "demodulating unit."

Next, a description is made of an example as to a structure of a signal frame employed when the PLC modem 100 performs a communication operation. FIG. 4A is a diagram for indicating one example as to a structure of a signal frame 400. The signal frame 400 contains a preamble field 410, a control signal field 420, and an information field 430. The preamble field 410 contains information which is required for transmitting the signal frame 400. The control signal field 420 performs a communication control operation when a connection processing operation is carried out. The information field 430 contains actual data other than the data of the control signal field 420 and the preamble field 410.

The preamble field 410 includes a known signal having a predetermined parameter. The predetermined parameter is previously defined based upon a communication specification, and the like. The predetermined parameter is commonly used among PLC modems 100 which are connected to the power line network.

The control field 420 contains information (for instance, MAC addresses and the like contained by source PLC modem 100 and destination PLC modem 100) which is required to transmit and/or receive data. The control signal field 420 and the information field 430 are random signal.

Since the PLC modem 100 analyzes the preamble field 410 which includes the known signal, the PLC modem 100 can detect a carrier. The process operations as to the control signal field 420 and the information field 430 can be carried out after the carrier has been detected.

It should also be noted that the above-described predetermined parameter may be alternatively determined when an authentication processing operation is carried out between PLC modems 100 connected to the power line network.

FIG. 4B is a schematic diagram for showing an example as to the structure of the preamble 410. As indicated in FIG. 4B, one preamble 410 is constituted by a short preamble 411, a long preamble 412 having a symbol length longer than a symbol length of the short preamble 411, and a synchronization preamble 413 for performing a synchronization. These preambles 411, 412, 413 are successively arrayed on a time axis.

Each of the short preamble 411 and the long preamble 412 has a plurality of symbols. A symbol length "$t_s$" of each of the symbols for constructing the short preamble 411 is made shorter than a symbol length "$t_l$" of each of the symbols for constituting the long preamble 412, and is a variable length. While it is so conceived that a sampling frequency is constant, the symbol length "$t_l$" of each of the symbols for constructing the long preamble 412 is determined to become "N" times longer than the symbol length "$t_s$" of each of the symbols for constituting the short preamble 411. Symbol "N" is a natural number, and is equal to 4 in this case. Also, the respective symbols which constitute the long preamble 412 and the short preamble 411 are transmitted in response to a large number of subcarriers which are contained in an OFDM (Orthogonal Frequency Division Multiplexing) signal corresponding to a multi-carrier signal. The symbol length "$t_s$" of each symbol of the short preamble 411 shown in FIG. 4B is 2.048 μsec. The length "$t_l$" of each symbol of the long preamble 412 shown in FIG. 4B is 8.192 μsec. The symbol length "$t_s$" of each symbol of the short preamble 411 and the symbol length "$t_l$" of each symbol of the long preamble 412 have an arbitrary relationship of $t_s < t_l$. The symbol length "$t_s$" of each of the symbols which constitute the short preamble 411 is controlled by the control unit 10 in such a manner that the relationship of $t_s < t_l$ can be satisfied.

Also, a symbol length "$T_S$" of the short preamble 411 represented in FIG. 4B is 16.384 μsec. A symbol length "$T_L$" of the long preamble 412 represented in FIG. 4B is 73.728 μsec. Both the symbol length "$T_S$" of the short preamble 411 and the symbol length "$T_L$" of the long preamble 412 have an arbitrary relationship of $T_S < T_L$.

As previously described, each of the symbols for constituting the short preamble 411 and each of the symbols for constituting the long preamble 412 is a known signal having a predetermined parameter. As the predetermined parameter, a symbol length, a ratio of the symbol lengths of the respective symbols for constituting the short preamble 411 to the respective symbols for constituting the long preamble 412, and a ratio of a number of subcarriers which constitute a multi-carrier signal of the short preamble 411 to a number of subcarriers which constitute a multi-carrier signal of the long preamble 412 may be conceived.

FIG. 4C is a diagram for showing one example as to a frequency spectrum of a large number of subcarriers which constitute a multi-carrier signal of the short preamble 411. FIG. 4D is a diagram for showing one example as to a frequency spectrum of a large number of subcarriers which constitute a multi-carrier signal of the long preamble 412. With respect to the long preamble 412, the communication unit 20 arranges a previously-determined number of subcarriers on a frequency axis in a constant interval. On the other hand, with respect to the short preamble 411, the communication unit 20 decimates out a number of subcarriers to be used by (1/N), as compared with the long preamble 412, so as to extend intervals between adjoining subcarriers (decimated subcarriers are indicated by chained lines). As a result, orthogonal characteristics of signals between the adjoining subcarriers may be maintained. In this example, a total number of the subcarrier is decimated into ¼.

As previously described, with respect to the short preamble 411, since the communication unit 20 changes the structures of the plurality of subcarriers contained in the multi-carrier signal by maintaining the relationship of the mutual symbol lengths, the orthogonal characteristics of the signals between the subcarriers located adjacent to each other on the frequency axis, and can establish that the signals do not interfere with each other between the adjoining subcarriers.

Next, a description is made of the signal receiving unit 20A.

The signal receiving unit 20A has a function capable of detecting a carrier by checking a presence of a preamble which is provided at a head position of a signal frame transmitted by each of the PLC modems 100. The signal receiving unit 10A detects a preamble appeared on the power line 340 in order to detect a carrier, and then, performs various sorts of communication control operations based upon a detection result of this preamble.

Figure 5:
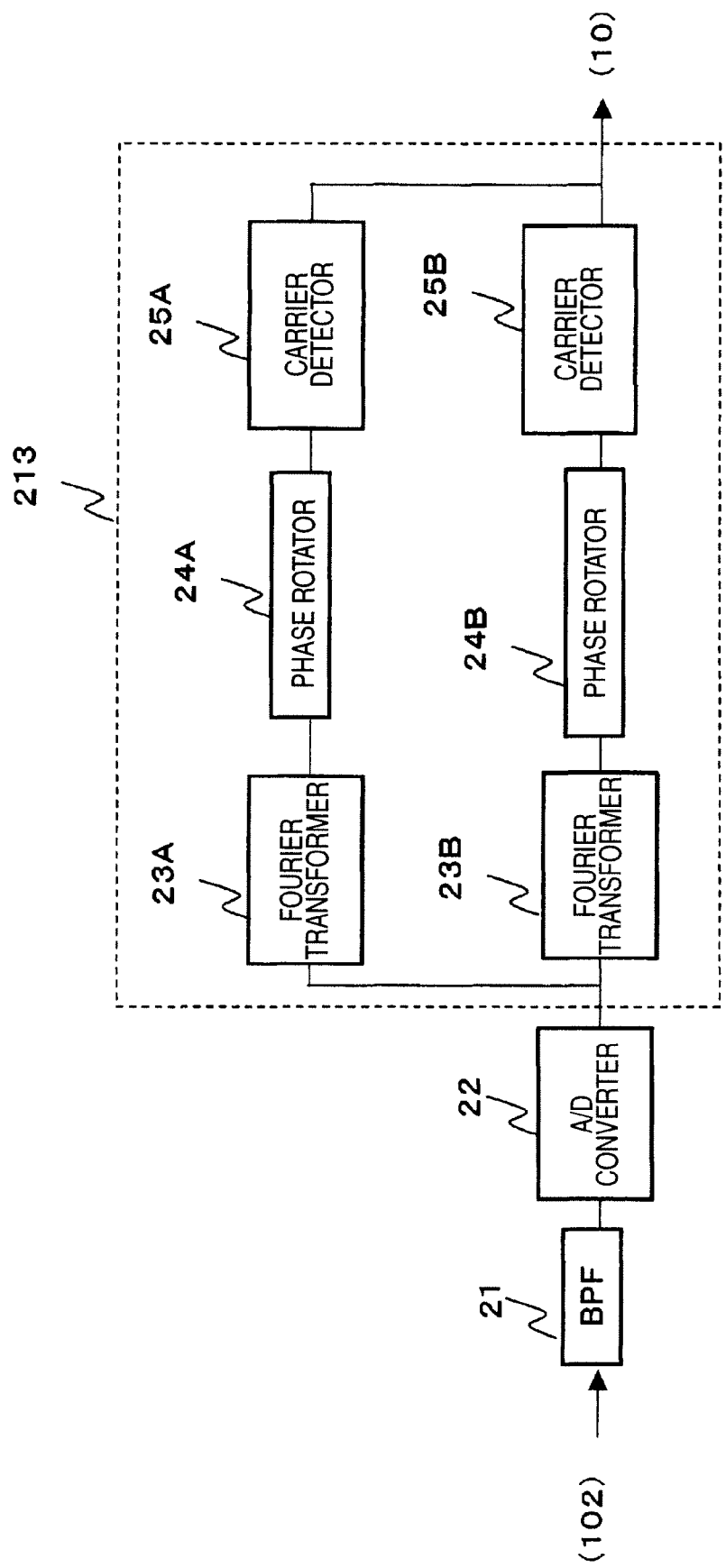
FIG. 5 is a block diagram for representing one example as to a carrier detecting unit according to the embodiment.

FIG. 5 is a diagram for showing one example as to an arrangement of the signal receiving unit 20A related to the carrier detection. The signal receiving unit 20A includes a band-pass filter (BPF) 21, an A/D converter 22, two sets of Fourier transformers (FFT) 23A and 23B, two sets of phase rotators 24A and 24B, and two sets of carrier detectors 25A and 25B. It should also be understood that the carrier detectors 25A and 25B have a function as a "carrier detecting unit."

A description is made of sequential operations for detecting a short preamble and a long preamble by the signal receiving unit 20A.

A signal transmitted over the power line 340 is transferred via the power supply connector 102 and the like to the BPF 21 and the A/D converter 22. Thereafter, the process operations by the Fourier transformer 23A, the phase rotator 24A, and the carrier detector 25A are performed so as to detect whether or not the short preamble is present, whereas the process operations by the Fourier transformer 23B, the phase rotator 24B, and the carrier detector 25B are performed so as to detect whether or not the long preamble is present. The detection result is transmitted to the control unit 10. As a result, the signal receiving unit 20A can firmly detect both the short preamble and the long preamble respectively from the signal appeared on the power line 340.

In accordance with such a signal receiving unit 20A, even in such a case that the carrier cannot be detected by employing the short preamble due to an adverse influence caused by a characteristic deterioration in a transmission line, the carrier can be detected by employing the long preamble in high probability. Accordingly, it is possible to surely evade a collision between the signals transmitted by a plurality of the PLC modems 100. As a consequence, it is possible to suppress that the signal is resent by the PLC modem 100. Also, in such a case that the carrier can be detected by employing the short preamble, since the communication is carried out based upon the signal from which the carrier has been detected by employing the short preamble, the back off time can be shortened and the transmission efficiency can be improved.

Also, in the case that the carrier cannot be detected by employing the short preamble 411 due to an adverse influence caused by a characteristic deterioration in a transmission line, but the carrier is detected by employing the long preamble 412, the respective structural symbols "$t_s$" of the short preamble 411 may be controlled to be prolonged. As a result, since the respective structural symbols "$t_s$" of the short preamble 411 are prolonged so as to be properly adapted to the condition of the transmission line, the unit back off time of the communication apparatus can be suppressed to a minimum necessary time.

Further, in such a case that the carrier detection by employing the long preamble 412 fails, and the carrier detection by employing short preamble 411 can succeed, it is conceivable that an error detection occurs. In the case of the error detection, it is so conceivable that this condition is equivalent to such a condition that the carrier cannot be detected by employing the short preamble 411 due to the adverse influence caused by the characteristic deterioration in the transmission line. Accordingly, in case of the error detection, the respective structural symbols "$t_s$" of the short preamble 411 may be controlled to be prolonged. As a result, since the respective structural symbols "$t_s$" of the short preamble 411 are prolonged so as to be properly adapted to the condition of the transmission line, the unit back off time of the communication apparatus can be suppressed to a minimum necessary time.

Figure 18:
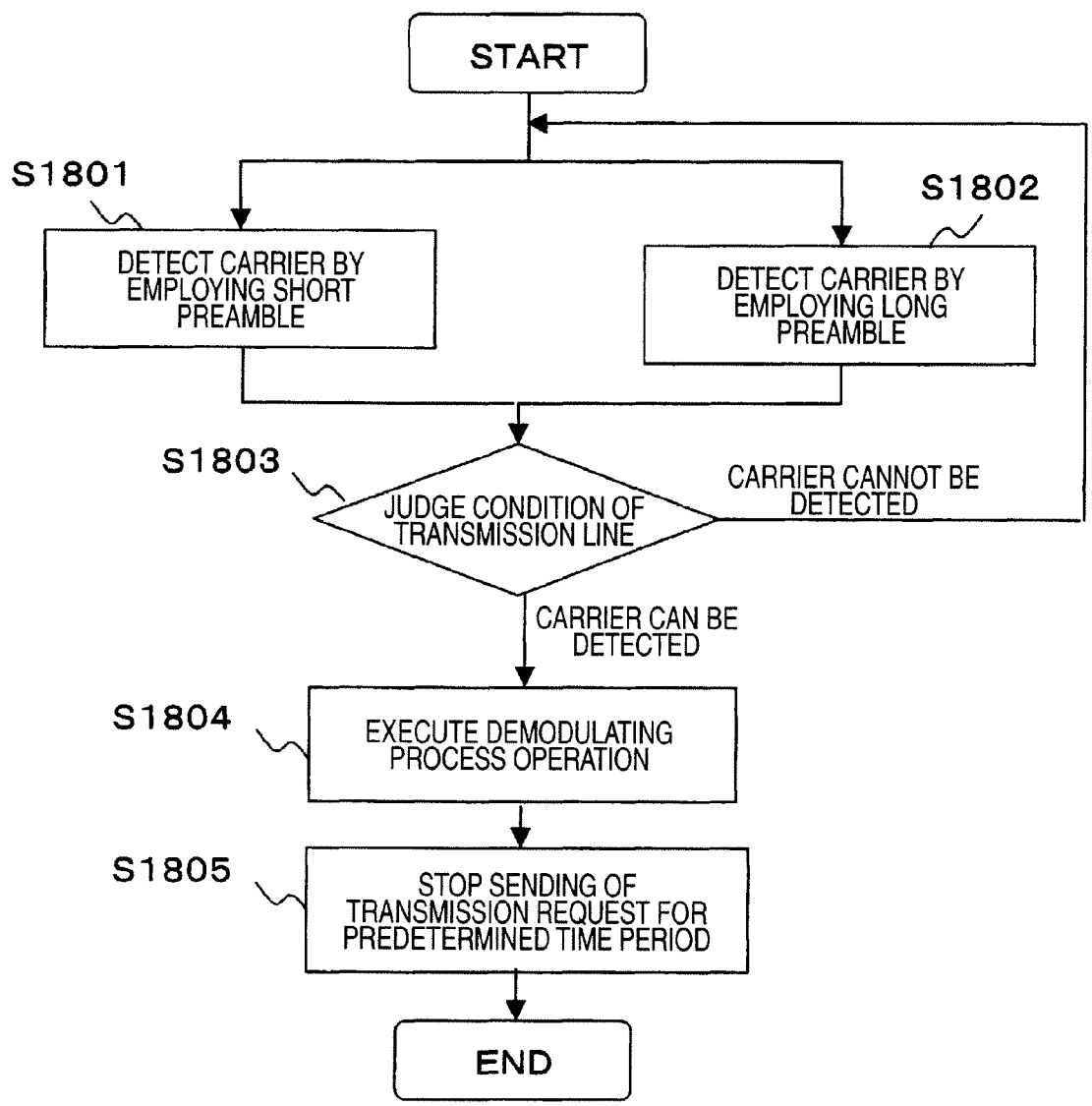
FIG. 18 is a diagram for showing one example as to operation of a PLC modem 100 when a signal frame is received, according to the embodiment.

Next, a description is made of operations of the PLC modem 100 when the PLC modem 100 receives a signal frame. FIG. 18 is a flow chart for indicating one example as to the operations of the PLC modem 100 when the signal frame is received. It should be understood that the operations of FIG. 18 are carried out in any one of a PLC modem which functions as a master, and another PLC modem which functions as a slave (will be explained later).

Firstly, when the communication unit 20 receives the signal frame, the carrier detector 25A detects a carrier by employing a short preamble (step S1801), and the carrier detector 25B detects a carrier by employing a long preamble (step S1802).

Then, the control unit 10 judges a condition of the power line 340 corresponding to the transmission line (step S1803). Concretely speaking, the control unit 10 judges whether or not at least one of the carrier detectors 25A and 25B detects a carrier.

When the control unit 10 judges that at least one of the carrier detectors 25A and 25B could detect the carrier, the communication unit 20 performs a demodulating process operation of the signal (step S1804). Since this demodulating process operation is carried out, a transmission source of the signal frame (namely, which PLC modem 100 has transmitted signal), a content of the signal frame, and a symbol length can be recognized.

After the demodulating process operation has been accomplished, the control unit 10 stops to send a transmission request to the signal transmission unit 20B for a predetermined time period (step S1805). The predetermined time period during which sending of the transmission request is stopped is determined based upon a control signal 420 which is referred to after the modulating process operation. Alternatively, this predetermined time period may be a fixed time period. It should also be noted that when a symbol length is a fixed symbol length, there is no need to perform the demodulating process operation before the transmission request is issued. That is why, if the symbol length is known, then sending of transmission request is merely stopped for such a time period equal to the known symbol length.

The timing when the control unit 10 stops to issue the transmission request to the signal transmitting unit 20B becomes such a timing before the control unit 10 sets the symbol lengths "$t_s$" of the respective symbols which constitute the short preamble 411.

When the control unit 10 judges that any of the carrier detectors 25A and 25B could not detected the carrier, the process operation is returned to the previous steps S1801 and S1802.

In accordance with the PLC modem 100 shown in FIG. 18, it is possible to avoid that the signal which is transmitted on the power line 340 collides with the signal which is transmitted from the signal transmitting unit 20B.

Also, it is desirable that the carrier detection can succeed in the carrier detector 25A which performs the carrier detection by employing the short preamble. This reason is that since the short preamble is present at the head of the signal frame, the control unit 10 can judge the condition of the power line 340 at an earlier stage and can stop to send the signal transmission request. Since the carrier detector 25A can succeed in the carrier detection, it is possible to more firmly avoid that the transmission signal from the PLC modem 100 collides with the signal transmitted over the power line 340.

It is desirable to perform the demodulating process operation in such a case that the carrier detection could succeed with employment of the long preamble. This reason is given as follows: That is, for example, in the case that the carrier detection could succeed with employment of the short preamble and the carrier detection could not succeed with employment of the long preamble, there are many possibilities that signals received by the communication unit 20 are noises, so that reliability of the carrier detection is low.

Also, in the case that the carrier detection could succeed with employment of the short preamble and the carrier detection could not succeed with employment of the long preamble, the signal received by the communication unit 20 is predicted as the noise, and it is suitable to cancel that the transmission request is stopped.

Under the normal communication environment, when the signal frame is received by the communication unit 20, any of the carrier detectors 25A and 25B can succeed in the carrier detection. On the other hand, under the deteriorated communication environment, although the carrier detector 25B can succeed in the carrier detection, there are some possibilities that the carrier detector 25A fails in the carrier detection. This reason is given as follows: In the carrier detection by the carrier detector 25A, the total carrier number is small, so that the carrier detection precision is low, as compared with the carrier detection by the carrier detector 25B. In such a case that the result of the carrier detection made by the carrier detector 25A cannot satisfy a predetermined reference, such a control operation for prolonging a symbol length of a short preamble is carried out by operations of the control unit 10 indicated in FIG. 6 and FIG. 7 (will be explained later).

Figure 6:
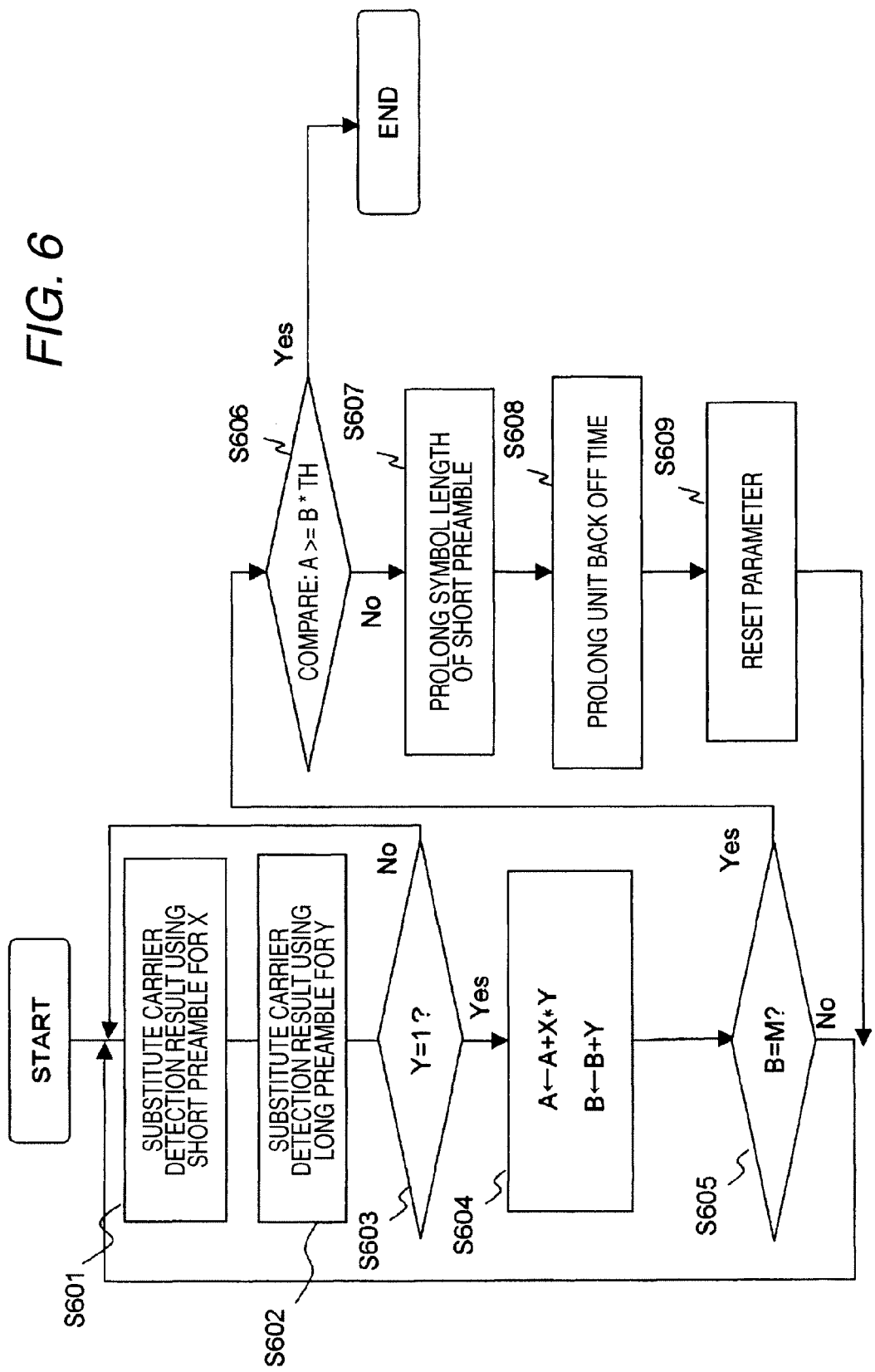
FIG. 6 is a flow chart for describing one example as to operations of a control unit according to the embodiment.

Next, a description is made of control operations executed by the control unit 10. FIG. 6 is a flow chart for describing one example as to operations when the control unit 10 controls a symbol length of a short preamble and a unit back off time. In FIG. 6, an arrow "←" indicated in a step of a process operation implies that a calculation result of a right hand is substituted for a left hand.

The control operation described in FIG. 6 supposes that both a symbol length of a short preamble of a signal transmitted by the PLC modem 100 and a unit back off time of the PLC modem 100 are changed, and the changed unit back off time of the PLC modem 100 is notified to another PLC modem 100.

As a result, both the symbol length of the short preamble and the unit back off time of the PLC modem 100 are temporarily different from the symbol length of the short preamble and the unit back off time of another PLC modem 100 at the processing timing shown in FIG. 6. However, in accordance with a method for changing the unit back off time (will be discussed later), the symbol lengths of the short preambles and the unit back off times of the respective PLC modems 100 are adjusted to be made equal each other. Also, the process operation of FIG. 6 is carried out in the respective PLC modems 100, for example, in a periodical manner. Also, for instance, the process operation of FIG. 6 is executed in such a case that another PLC modem 100 is newly added.

In a step S601, the communication unit 20 performs a carrier detection by employing a short preamble of a signal appeared on the power line 340. When the communication unit 20 can detect the carrier, the control unit 10 substitutes "1" for a variable "X." When the communication unit 20 cannot detect the carrier, the control unit 10 substitutes "0" for the variable "X."

In a step S602, the communication unit 20 performs a carrier detection by employing a long preamble of a signal appeared on the power line 340. When the communication unit 20 can detect the carrier, the control unit 10 substitutes "1" for a variable "Y." When the communication unit 20 cannot detect the carrier, the control unit 10 substitutes "0" for the variable "Y."

A sequence of the processing operations of the above-described steps S601 and S602 may be alternatively reversed.

In a step S603, the control unit 10 compares the value of the variable "Y" with "1." If the value of the variable "Y" is equal to "1" (namely, if carrier can be detected), then the process operation is advanced to a next step S604. If the value of the variable "Y" is not equal to "1" (namely, if carrier cannot be detected), then the process operation is returned to the step S601. In other words, when the carrier can be detected by employing the long preamble, the process operation is advanced to a next step S604. It should also be noted that the comparing method defined in the step S603 is not limited only to the above-described comparing method.

In the step S604, the control unit 10 substitutes an accumulated value for a variable "B", while the accumulated value indicates a total time when the carriers could be detected by employing the long preamble. Also, the control unit 10 substitutes another accumulated value for a variable "A", while the accumulated value indicates a total time when the carriers could be detected by employing the long preamble, and at the same time, the carriers could be detected by employing the short preamble. Initial values of the variable "A" and the variable "B" are "0."

In a step S605, the control unit 10 compares the variable "B" with a predetermined time "M" for performing a detecting check of the long preamble by the communication unit 20. If the variable "B" is equal to the predetermined time "M", then the process operation is advanced to a next step S606. If the variable "B" is not equal to the predetermined time "M", then the process operation is returned to the step S601.

In the step S606, the control unit 10 compares the value (left hand) of the variable "A" with a calculation result (right hand) obtained by multiplying the value of the variable "B" by a threshold value "Th." In this case, the threshold value "Th" is a value defined between 0 and 1, for example, may be set as "0.9", or "1." If the control unit 10 judges that the value of the left hand is larger than, or equal to the value of the right hand, then the process operation is ended. If the control unit 10 judges that the value of the left hand is smaller than the value of the right hand, the process operation is advanced to a next step S607. It should also be noted that the comparing method defined in the step S606 is not limited only to the above-described comparing method.

In a step S607, the control unit 10 corrects the symbol length of the short preamble handled by the PLC modem 100 in such a manner that this symbol length is made longer than the previous symbol length.

In a step S608, the control unit 10 corrects the unit back off time in such a manner that the unit back off time is made longer than the previous unit back off time in coincident with the corrected symbol length which has been corrected in the step S607.

As a consequence, for instance, in such a case that the condition of the transmission line is deteriorated (in this condition, A<B*Th) by the process operations defined in the steps S607 and S608, the control unit 10 corrects the symbol length of the short preamble to be made long. Based upon the longer symbol length of this short preamble, the control unit 10 corrects the unit back off time to become long.

In a step S609, the control unit 10 resets the respective parameters (X, Y, A, B). Then, the process operation is returned to the previous step S601 in which the control unit 10 repeatedly executes the process operation.

As a consequence, both the symbol length of the short preamble and the unit back off time can be automatically adjusted in correspondence with the condition of the power line 340 corresponding to the transmission line. Even in such a case that the condition of the transmission line is deteriorated, since the symbol of the short preamble is made long, the carrier detection with employment of the short preamble can be readily carried out. Also, the unit back off time is automatically adjusted based upon the corrected symbol length of the short preamble, so that the back off time can be properly adjusted in accordance with the condition of the transmission line.

Although not shown in FIG. 6, in the case that the threshold value "Th" is "1", when the condition of "A>=B*Th" defined in the step S606 can be satisfied, such a condition may be established that the short preamble is detected in the same probability as that of the long preamble. As a result, the control unit 10 may alternatively change the symbol length of the symbol which constitutes the long preamble to become equal to that of the short preamble. Accordingly, the entire frame length of the signal frame to be transmitted can be shortened. Even in such a case that the PLC modem 100 detects the carrier by employing the long preamble, the back off time is shortened, so that the transmission efficiency can be furthermore improved.

In accordance with the above-described control operation executed by the control unit 10 as shown in FIG. 6, both the symbol length of the short preamble and the unit back off time can be properly adjusted, so that the carrier can be detected in the stable manner, and at the same time, the transmission efficiency can be improved.

Figure 7:
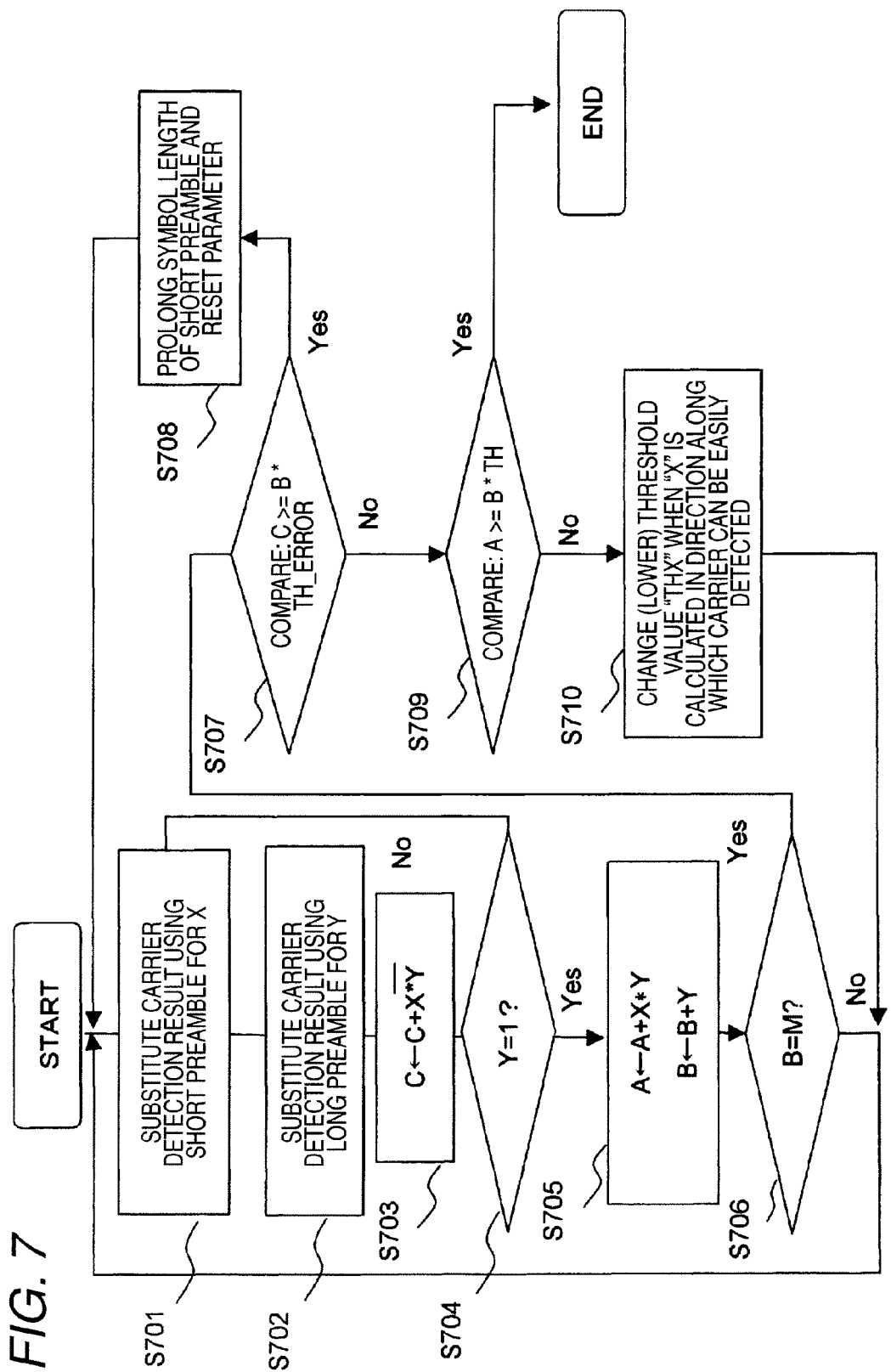
FIG. 7 is a flow chart for describing another example as to operations of the control unit according to the embodiment.

FIG. 7 is a flow chart for describing another example as to operations when the control unit 10 controls a symbol length of a short preamble and a unit back off time. In FIG. 7, an arrow "←" indicated in a step of a process operation implies that a calculation result of a right hand is substituted for a left hand.

The control operation described in FIG. 7 supposes that both a symbol length of a short preamble of a signal transmitted by the PLC modem 100 and a unit back off time of the PLC modem 100 are changed, and the changed unit back off time of the PLC modem 100 is notified to another PLC modem 100. As a result, both the symbol length of the short preamble and the unit back off time of the PLC modem 100 are temporarily different from the symbol length of the short preamble and the unit back off time of another PLC modem 100 at the processing timing shown in FIG. 7. However, in accordance with a method for changing the unit back off time (will be discussed later), the symbol lengths of the short preambles and the unit back off times of the respective PLC modems 100 are adjusted to be made equal each other. Also, the process operation of FIG. 7 is carried out in the respective PLC modems 100, for example, in a periodical manner. Also, for instance, the process operation of FIG. 6 is executed in such a case that another PLC modem 100 is newly added.

In a step S701, the communication unit 20 performs a carrier detection by employing a short preamble of a signal appeared on the power line 340. When the communication unit 20 can detect the carrier, the control unit 10 substitutes "1" for a variable "X." When the communication unit 20 cannot detect the carrier, the control unit 10 substitutes "0" for the variable "X." In the step S701, threshold values for determining carrier detectability by the communication unit 20 are independently employed as a short preamble threshold value "Thx" and a long preamble threshold value "Thy." Also, while the short preamble threshold value "Thx" is variable, this threshold value "Thx" is automatically corrected by a step S710 (will be discussed later).

In a step S702, the communication unit 20 performs a carrier detection by employing a long preamble of a signal appeared on the power line 340. When the communication unit 20 can detect the carrier, the control unit 10 substitutes "1" for a variable "Y." When the communication unit 20 cannot detect the carrier, the control unit 10 substitutes "0" for the variable "Y."

A sequence of the processing operations of the above-described steps S701 and S702 may be alternatively reversed.

In a step S703, the control unit 10 substitutes an accumulated value for a variable "C", while the accumulated value indicates a total time when the carriers were erroneously detected with respect to the long preamble. In this example, when a carrier has not been detected by employing the long preamble, and at the same time the carrier detection with employment of the short preamble could succeed, it is so assumed that the error detection of the carrier occurs, so that the time is counted. When the communication unit 20 could not detect the carrier, the control unit 10 substitutes "1" for a variable "Y." When the communication unit 20 could detect the carrier, the control unit 10 substitutes "0" for the variable "Y."

In a step S704, the control unit 10 compares the value of the variable "Y" with "1." If the value of the variable "Y" is equal to "1", then the process operation is advanced to a next step S705. If the value of the variable "Y" is not equal to "1", then the process operation is returned to the step S701. In other words, when the carrier can be detected by employing the long preamble, the process operation is advanced to a next step S705. It should also be noted that the comparing method defined in the step S704 is not limited only to the above-described comparing method.

In the step S705, the control unit 10 substitutes an accumulated value for a variable "B", while the accumulated value indicates a total time when the carriers could be detected by employing the long preamble. Also, the control unit 10 substitutes another accumulated value for a variable "A", while the accumulated value indicates a total time when the carriers could be detected by employing the long preamble, and at the same time, the carriers could be detected by employing the short preamble. Initial values of the variable "A" and the variable "B" are "0."

In a step S706, the control unit 10 compares the variable "B" with a value of "M" for performing a detecting check of the carriers with employment of the long preamble and the short preamble by the communication unit 20. If the variable "B" is equal to the value "M", then the process operation is advanced to a next step S707. If the variable "B" is not equal to the value "M", then the process operation is returned to the step S701.

In the step S707, the control unit 10 compares the value (left hand) of the variable "C" with a calculation result (right hand) obtained by multiplying the value of the variable "B" by a threshold value "Th_error." If the control unit 10 judges that the value of the left hand is larger than, or equal to the value of the right hand, then the process operation is advanced to a step S708. If the control unit 10 judges that the value of the left hand is smaller than the value of the right hand, the process operation is advanced to a next step S709. In other words, in such a case that a frequency for erroneously detecting a carrier with employment of the short preamble is higher than a predetermined reference, the process operation is advanced to the step S708. As to the content of the comparing process in the step S707, the below-mentioned various modifications may be conceived. The threshold value "Th_error" is selected to be a value between 0 and 1, for instance, "0.1."

As a modification of the step S707, it is so conceivable that while the control unit 10 employs the erroneous detection count "C" of the short preamble without employing the variable "B", the control unit 10 compares the threshold value "Th_error" (right hand) with a calculation result (left hand) obtained by dividing the value of the variable "C" by the variable "A." In this case, if the value of the left hand is larger than, or equal to the right hand, then the process operation is advanced to the step S708, whereas if the value of the left hand is smaller than the right hand, then the process operation is advanced to a next step S709.

Furthermore, as another modification, it is so conceivable that the control unit 10 compares the value (left hand) of the variable "C" with a calculation result (right hand) obtained by multiplying the variable "A" by the threshold value "Th_error." In this case, if the value of the left hand is larger than, or equal to the value of the right hand, then the process operation is advanced to the step S708, whereas if the value of the left hand is smaller than the value of the right hand, then the process operation is advanced to the step S709.

In the step S708, the control unit 10 corrects the symbol length of the short preamble handled by the PLC modem 100 in such a manner that this symbol length is made longer than the previous symbol length. Also, the control unit 10 corrects the unit back off time in such a manner that the unit back off time is made longer than the previous unit back off time based upon the corrected symbol length which has been corrected. Moreover, the control unit 10 resets the respective parameters (X, Y, A, B, C). Then, the process operation is returned to the previous step S701 in which the control unit 10 repeatedly executes the process operation. As a consequence, both the symbol length of the short preamble and the unit back off time can be automatically corrected in such a case that the frequency of erroneously detecting the carriers with employment of the short preamble is higher than the predetermined reference, so that the symbol length of the short preamble and the unit back off time can be properly maintained.

In the step S709, the control unit 10 compares the value (left hand) of the variable "A" with a calculation result (right hand) obtained by multiplying the value of the variable "B" by a threshold value "Th." If the value of the left hand is larger than, or equal to the value of the right hand, then the process operation is ended. If the value of the left hand is smaller than the value of the right hand, the process operation is advanced to a next step S710. In this case, the threshold value "Th" is a value defined between 0 and 1, for example, may be set as "0.9", or "1."

In the step S710, the control unit 10 corrects the threshold value "Thx" so that the carrier detection by the communication unit 20 can be readily carried out, while this threshold value "Thx" is used by the communication unit 20 so as to detect the carrier of the short preamble in the step S701. In other words, the control unit 10 lowers the threshold value "Thx." Since the threshold value "Thx" is corrected, a number of times for detecting the carriers with employment of the short preamble is increased.

In accordance with the above-described control operation executed by the control unit 10 as shown in FIG. 7, both the symbol length of the short preamble and the unit back off time can be properly adjusted, so that the carrier can be detected in the stable manner, and at the same time, the transmission efficiency can be improved.

In combination with the control operations for controlling the preamble lengths of the short preambles and the unit back off times represented in FIG. 6 and FIG. 7, although not shown, while the PLC modem 100 contains a predetermined default value with respect to the symbol length of the short preamble, the control unit 10 resets the symbol lengths of the short preambles every predetermined time period so as to return the symbol lengths to the default value, so that the symbol lengths of the short preambles may be alternatively shortened. In this alternative case, the unit back off time is also shortened based upon the symbol length of the short preamble by the control unit 10.

Next, a description is made of a power line communication system 1000 which contains a plurality of PLC modems 100.

In this case, all of the PLC modems 100 which construct the same power line communication system 1000 utilize the same unit back off time which has been unified. To this end, a control unit 10 of each of the PLC modems 100 performs such a control operation that a communication unit 20 thereof notifies information about the unit back off time to other PLC modems 100 which constitute the power line communication system 1000.

First, description is made of the power line communication system 100 which performs communications among a plurality of PLC modems 100 by employing a beacon signal. As such a power line communication system 1000, for example, a power line communication system 1000A which constitutes a central control type network may be conceived. A central control type network implies such a network having a PLC modem 100A and another PLC modem 100B, while the PLC modem 100A functions as a master for managing a communication and the PLC modem 100B functions as a slave whose communication is controlled by the PLC modem 100A.

Figure 8:
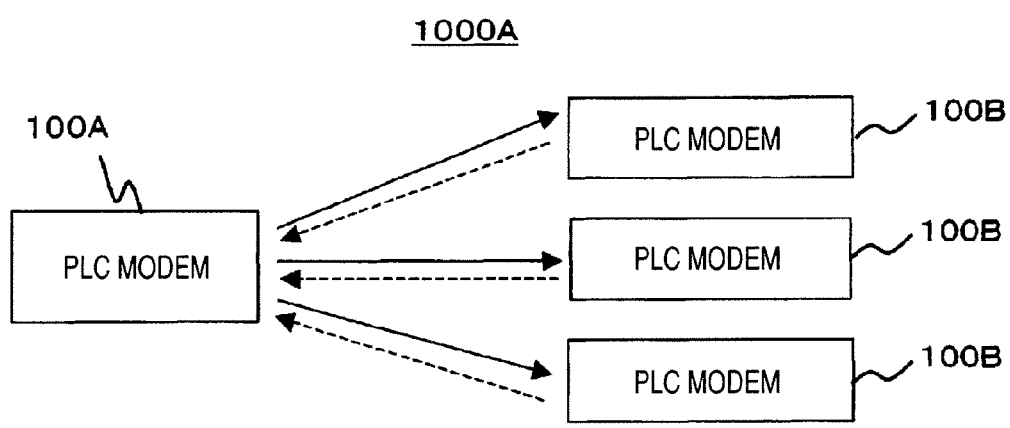
FIG. 8 is a block diagram for showing one example as to an arrangement of a power line communication system which constitutes a central control type network, according to the embodiment.

FIG. 8 is a block diagram for indicating one example as to an arrangement of the power line communication system 1000A. The power line communication system 1000A contains the PLC modem 10A, and also, one, or more sets of the PLC modems 100B. Although a total set of the PLC modems 100B is selected to be 3 in this example, the total quantity of these PLC modems 100B is not limited only to three sets.

Figure 9:
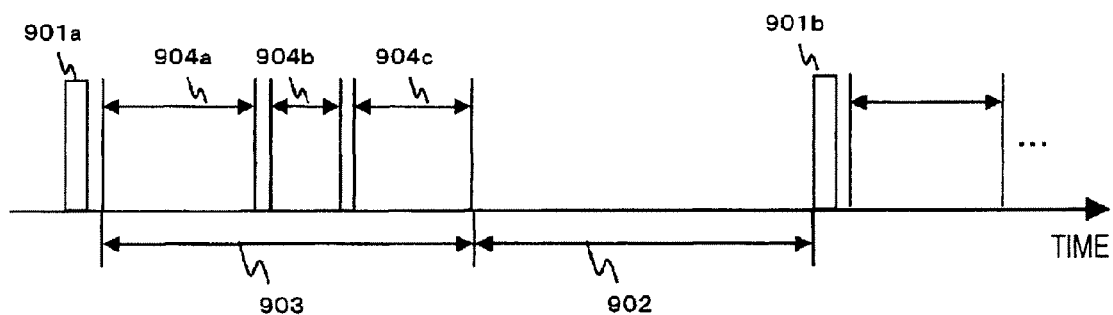
FIG. 9 is a diagram for showing one example as to a time chart of a signal on a transmission line in the power line communication system which constitutes the central control type network, according to the embodiment.

FIG. 9 is a diagram for representing one example as to a time chart of a signal on a transmission line in the power line communication system 1000A. Beacon signals 901a, 901b, - - -, are sent out by the PLC modem 100A. While this beacon signal 901a is defined as a reference signal, a TDMA (Time Division Multiple Access) period 902 and a CSMA period 903 are repeated on a time axis. In this example, the CSMA period 903 contains a period 904a applied to a PLC modem 100B1 functioning as a first slave, a period 904b applied to a PLC modem 100B2 functioning as a second slave, and a period 904c applied to a PLC modem 100B3 functioning as a third slave.

In the power line communication system 1000A, the communication units 20 of the respective PLC modems 100B notify the PLC modem 100A of information about unit back off times which are uniquely being used by the respective PLC modems 100B, and the communication unit 20 of the PLC modem 100A adds the information about the unit back off time which should be used in the system into the beacon signal transmitted by the PLC modem 100A, and then, notifies the resulting beacon signal.

As a consequence, both the PLC modem 100A and the respective PLC modems 100B can grasp the unit back off times which are being used by other PLC modems 100, and can use an unified unit back off time. Instead of transmitting of the beacon signal, the PLC modem 100A may alternatively send out a polling signal, a token signal, or the like. Also, the process operations for notifying the unit back off times by the above-described PLC modems 100A and 100B may be alternatively carried out not only within the CSMA period 903, but also within the TDMA period 902.

Figures 10, 11:
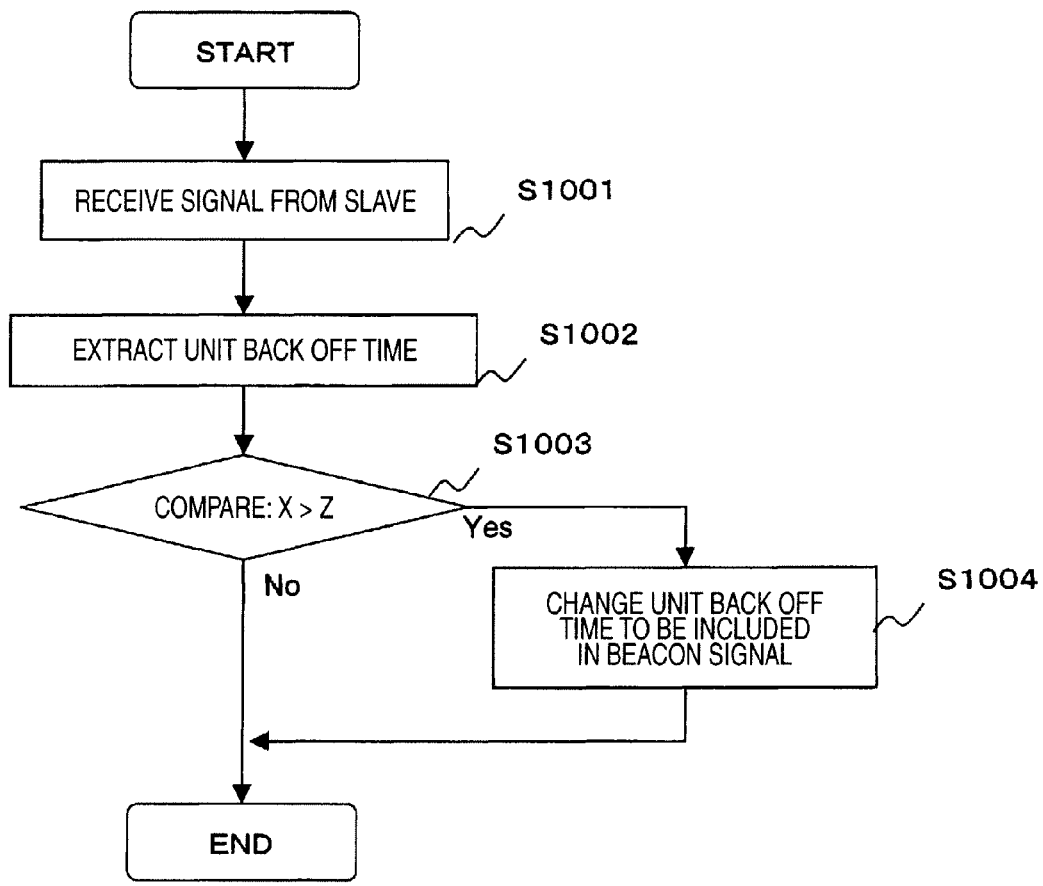
FIG. 10 is a diagram for indicating one example as to operations of a PLC modem which functions as a master in the power line communication system which constitutes the central control type network, according to the embodiment.
FIG. 11 is a diagram for showing one example as to an appliance management list, according to the embodiment.

Next, a description is made of one example as to a method for setting a unit back off time in the power line communication system 1000A. FIG. 10 is a flow chart for showing one example as to operations of the PLC modem 100A in the power line communication system 1000A. In this example, the system is operated in such a manner that information about a unit back off time is notified from the PLC modem 100A to the respective PLC modems 100B by utilizing beacon signals.

In a step S1001, the communication unit 20 detects signals respectively which are transmitted from the respective PLC modems 10B.

In a step S1002, the control unit 10 extracts information of a unit back off time from the received signals. As a result, the PLC modem 100A can grasp the unit back off times which are being used by the respective PLC modems 100B.

In a step S1003, the control unit 10 compares a value of a variable "Z" with a value of a variable "X." The value of the variable "Z" corresponds to a value of a unit back off time which is being used by the PLC modem 100A, and is equal to a maximum value among unit back off times which have been far notified from the respective PLC modems 100B. The value of the variable "X" corresponds to a value of a unit back off time which is being used by one set of the PLC modems 100B extracted in the step S1002. In the step S1003, if (X≦Z), then the process operation is accomplished. If (X>Z), then the process operation is advanced to a step S1004.

In the step S1004, the control unit 10 substitutes the value of the variable "X" for a value of another variable "Z" so as to update the value of this variable "Z", and then, the communication unit 20 transmits the updated value of the variable "Z" as information about a unit back off time unified in the entire system by including this updated value in a beacon signal. Also, the control unit 10 changes the unit back off time of the PLC modem 100A in coincident with the updated value of the variable "Z." Also, the control unit 10 changes the symbol length of the short preamble of the PLC modem 100A in coincident with the updated value of the variable "Z."

As a result, a maximum value among the unit back off times used by the respective PLC modems 100B which constitute the power line communication system 1000A is notified from the PLC modem 100A to the respective PLC modems 100B. As a consequence, since the control unit 10 of the PLC modem 100A changes the unit back off times used by the respective PLC modems 100B into the value notified from the PLC modem 100A, both the PLC modem 100A and the respective PLC modems 100B can use the unit back off time which has been unified in the entire system. Also, the respective PLC modems 100B change the symbol lengths of the short preambles.

In accordance with such a power line communication system 1000A shown in FIG. 10, all of the PLC modems 100 provided in the power line communication system 1000A can use the same unit off time.

Next, a description is made of another example as to a method for setting a unit back off time in the power line communication system 1000A. In this example, the PLC modem 100A manages an appliance management list 1100. In the appliance management list 1100, appliance identification information (for instance, MAC address etc.) for identifying the PLC modems 100B, unit back off times of the PLC modems 100B, and the like have been previously stored. The appliance management list 1100 is held in the memory 240 (refer to FIG. 3). FIG. 11 is a diagram for showing one example as to the appliance management list 1100.

In the appliance management list 1100, values of provisional unit back off times which have been previously determined with respect to the respective PLC modems 100B have been registered as initial values by the control unit 10. When a unit back off time from one PLC modem 100B is extracted, the control unit 10 updates the provisional back off time of this PLC modem 100B registered in the appliance management list 1100. Also, in such a case that a PLC modem 100B is newly added to the power line communication system 1000A, the control unit 10 sets a value of such a unit back off time under use by the power line communication system 1000A at a time instant when the above-described new PLC modem 100B is added as an initial value of the unit back off time of this newly added PLC modem 100B.

Figure 12:
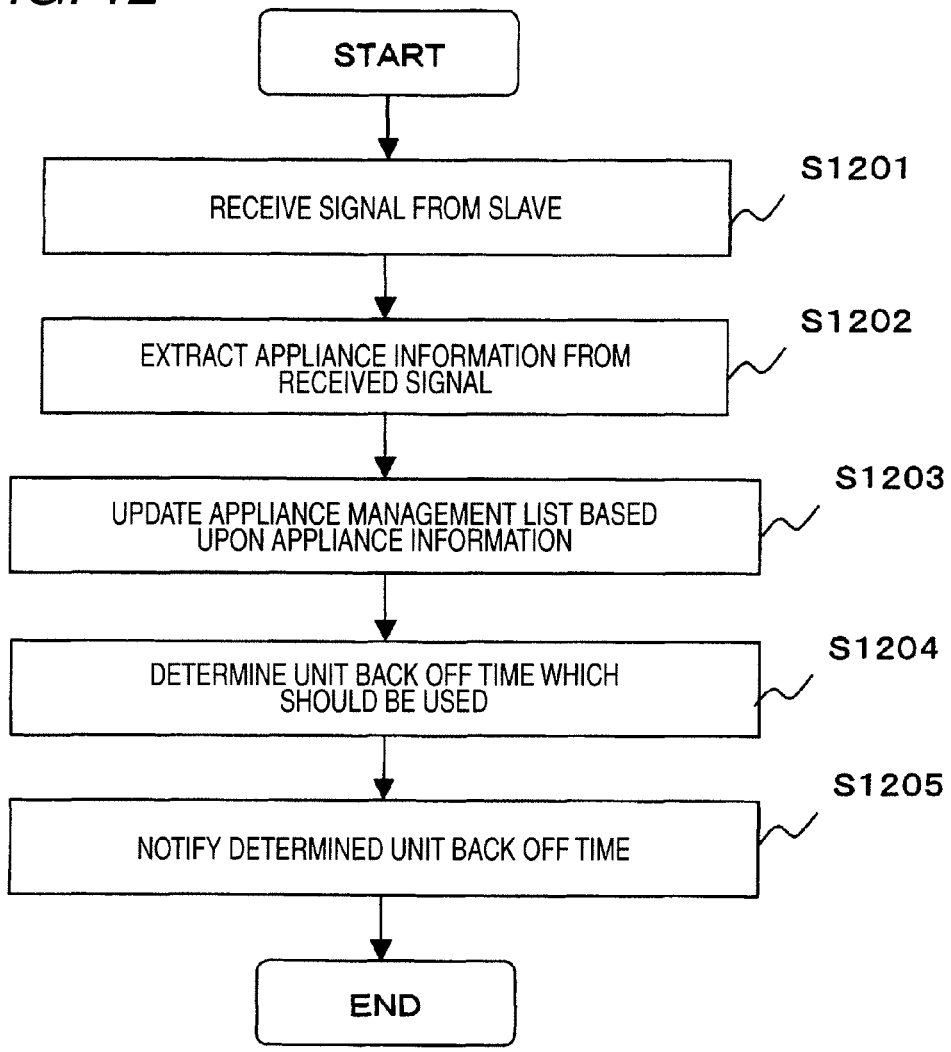
FIG. 12 is a diagram for indicating another example as to operations of a PLC modem which functions as a master in the power line communication system which constitutes the central control type network, according to the embodiment.

FIG. 12 is a flow chart for describing another example as to operations of the PLC modem 100A employed in the power line communication system 1000A.

In a step S1201, the communication unit 20 detects signals transmitted from the respective PLC modems 100B respectively.

In a step S1202, the control unit 10 extracts appliance information from the received signals, while the appliance information contains address information related to the PLC modems 100B, and information about unit back off times used by the PLC modems 100B. As a consequence, the PLC modem 100A can grasp the respective PLC modems 100B in correspondence with the unit back off times which are being used by these PLC modems 100B.

In a step S1203, the control unit 10 updates the appliance management list 1100 based upon the extracted appliance information.

In a step S1204, the control unit 10 determines a maximum value among the values of the unit back off times registered in the appliance management list 1100 as a unit back off time which should be used in the system.

In a step S1205, the communication unit 20 notifies the determined unit back off time to the respective PLC modems 100B.

In accordance with the power line communication system 1000A shown in FIG. 12, as to such a PLC modem 100 whose communication frequency is low, a unit back off time used by this PLC modem 100 can be firmly grasped, and the maximum value among the unit back off times which are being used by all of the PLC modems 100 can be used as the unit back off time unified in the entire system.

Next, a description is made of the power line communication system 100 which performs a communication operation without employing a beacon signal, or the like. As such a power line communication system 1000, for example, a power line communication system 1000B is conceivable which constructs a distributed control type network. The distributed control type network implies such a network that a specific PLC modem 100 is not handled as the PLC modem 100A and the PLC modem 100B, which function as a master and a slave.

Figure 13:
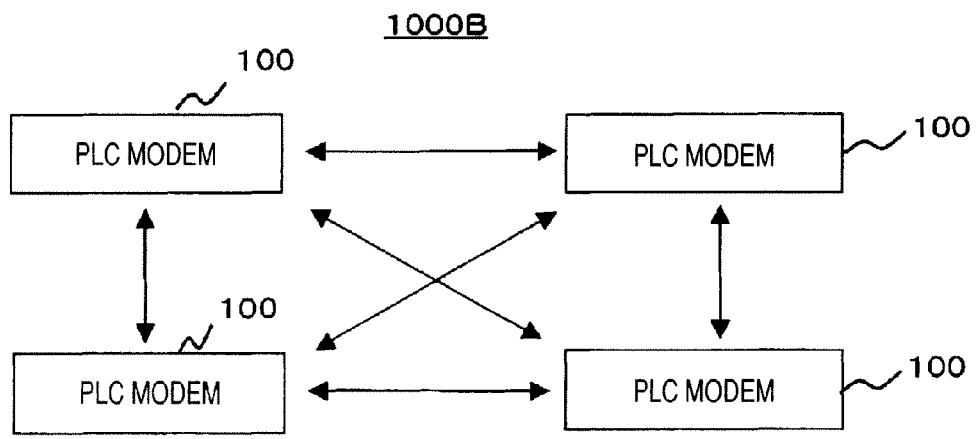
FIG. 13 is a block diagram for showing one example as to an arrangement of a power line communication system which constitutes a distributed control type network, according to the embodiment.

FIG. 13 is a block diagram for indicating one example as to a structure of the power line communication system 1000B. The power line communication system 1000B contains a plurality of PLC modems 100. In this example, although 4 sets of such PLC modems 100 are provided, a total set of these PLC modems 100 is not limited only to 4.

Figure 14:
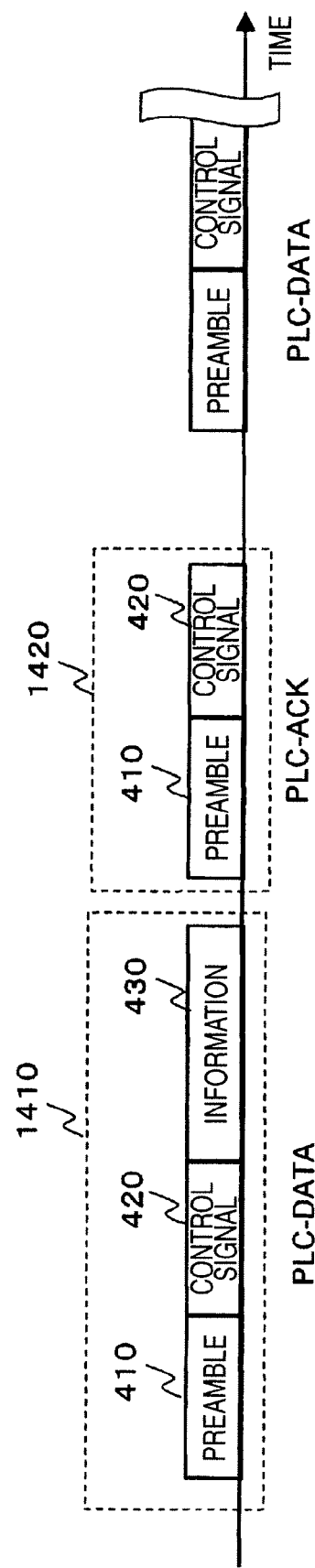
FIG. 14 is a diagram for showing one example as to a time chart of a signal on a transmission line in the power line communication system which constitutes the distributed control type network, according to the embodiment.

FIG. 14 is a diagram for indicating one example as to a time chart of a signal on a transmission line in the power line communication system 1000B. In this time chart, a data frame 1410 (PLC-DATA) transmitted by one PLC modem 100, and a response frame 1420 (PLC-ACK) are exemplified. The response frame 1420 is transmitted by another PLC modem 100 functioning as a communication counter party with respect to the data frame 1410.

The data frame 1410 contains a preamble field 410, a control signal field 420, and an information field 430, whereas the signal frame 1420 contains a preamble field 410 and a control signal field 420. Information about a unit back off time which is being used by either the PLC modem 100 or another PLC modem 100 functioning as the communication counter party may be involved in the control signal fields 420 contained in these frames 1410 and 1420.

Even in the power line communication system 1000A, the communication operation can be carried out by employing the signal shown in FIG. 14, and also, the information about the unit back off time is involved in the control signal field 420 contained in each of the respective frames, and then, this information of the unit back off time may be notified.

Figure 15:
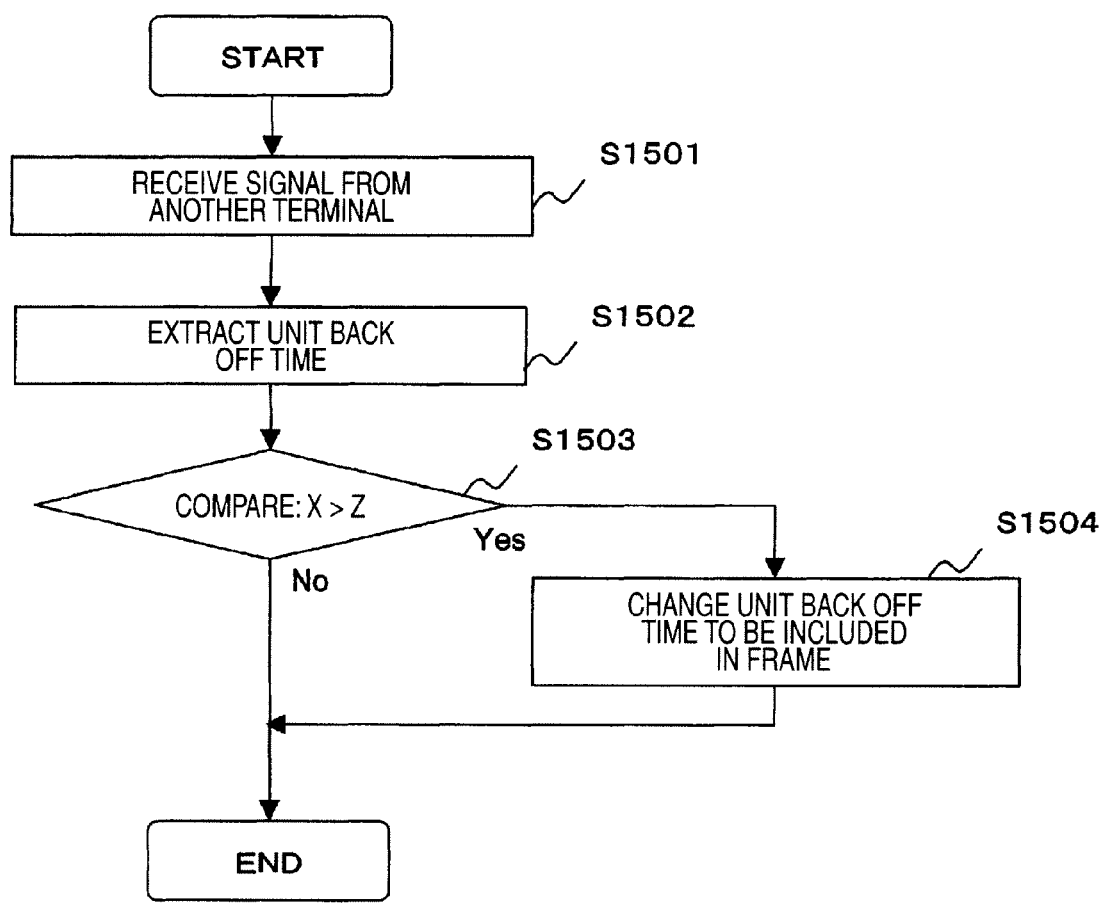
FIG. 15 is a diagram for indicating one example as to operations of a PLC modem in the power line communication system which constitutes the distributed control type network, according to the embodiment.
Figure 16:
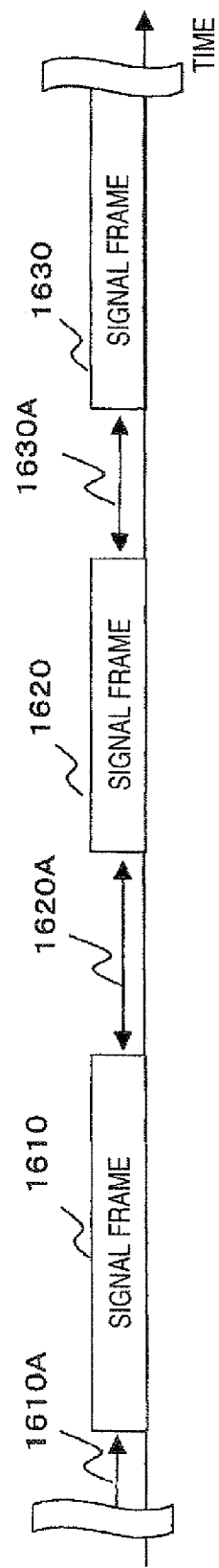
FIG. 16 is a diagram for explaining a back off time.
Figure 17:
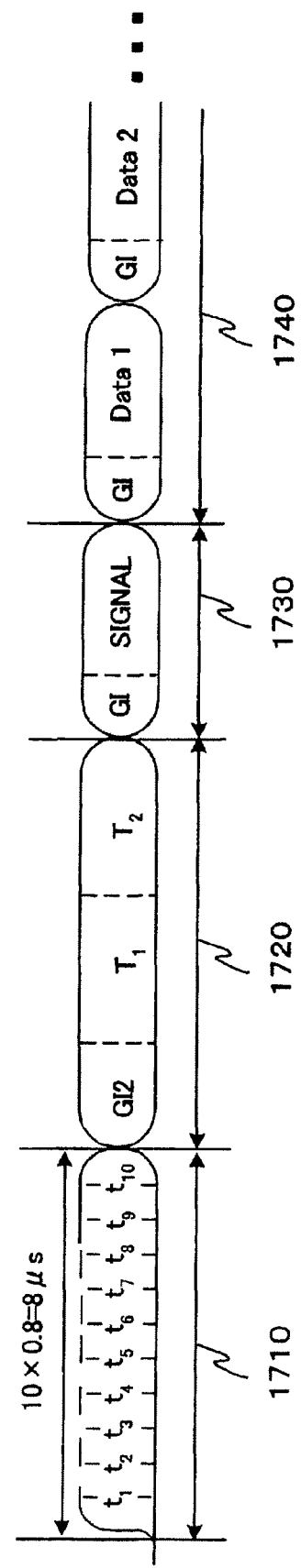
FIG. 17 is a diagram for indicating the structure of the signal frame which is employed in the conventional communication apparatus.

Next, a description is made of one example as to a method for setting a unit back off time in the power line communication system 1000B. FIG. 15 is a flow chart for showing one example as to operations of the PLC modem 100 in the power line communication system 1000B. In this example, the system is operated in such a manner that information about unit back off time of each of the respective PLC modems 100 is notified to another PLC modem 100 by using a control signal.

In a step S1501, the communication unit 20 detects signals respectively which are transmitted from other PLC modems 100.

In a step S1502, the control unit 10 extracts information of a unit back off time from the received signals in the step S1501. As a result, the PLC modem 100 can grasp the unit back off times which are being used by other PLC modems 100.

In a step S1503, the control unit 10 compares a value of a variable "Z" with a value of a variable "X." The value of the variable "Z" corresponds to a value of a unit back off time which is being used by the PLC modem 100, and is equal to a maximum value among unit back off times which have been so far notified from other PLC modems 100. The value of the variable "X" corresponds to a value of a unit back off time which is being used by one set of other PLC modems 100 extracted in the step S1502. In the step S1503, if $(X \leq Z)$, then the process operation is accomplished. If $(X>Z)$, then the process operation is advanced to a step S1504.

In the step S1504, the control unit 10 substitutes the value of the variable "X" for the value of another variable "Z" so as to update the value of this variable "Z", and then, the communication unit 20 transmits the updated value of the variable "Z" as information about a unit back off time being used the PLC modem 100 by including this updated value in the control signal field 420 of the signal frame. Also, the control unit 10 changes the unit back off time of the PLC modem 100 in coincident with the updated value of the variable "Z." Also, the control unit 10 changes the symbol length of the short preamble of the PLC modem 100 to coincide with the updated value of the variable "Z."

As a result, a maximum value among the unit back off times used by the respective PLC modems 100 which constitute the power line communication system 1000B is notified at any time to other PLC modems 100. Also, the control unit 10 of each of the PLC modems 100 changes the unit back off time into values notified from other PLC modems 100, which is used in such a case that this unit back off time is larger than that of the PLC modem 100. Accordingly, all of the PLC modems 100 can use the unit back off time which has been unified in the entire system. Also, other PLC modems 100 can change the symbol lengths of the short preambles.

In accordance with such a power line communication system 1000B, all of the PLC modems 100 provided in the power line communication system 1000B can use the same unit off time.

As previously explained, in accordance with the power line communication system 1000, the respective PLC modems 100 perform the communication operations by employing the same unit back off time. As a result, it is possible to avoid that only the specific PLC modem 100 delays to judge whether or not other PLC modems 100 have transmitted the signals, and that the signal from the PLC modem 100 is sent out after other PLC modems 100 have transmitted the signals. Accordingly, the signals can hardly collide with each other.

It should be noted that as transmission lines to which the present invention may be applied, power lines, communication media of other wired lines, and wireless paths may be conceived.

In the above-described communication apparatus, the symbol length of the second preamble signal is longer than the symbol length of the first preamble signal; and the control unit controls the symbol length of the first preamble signal based upon the comparison result of the comparing unit.

While employing the comparison result between the carrier detection result of the first preamble signal and the carrier detection result of the second preamble signal, the symbol length of the first preamble signal is controlled. As a result, the symbol length of the first preamble signal becomes a suitable length for the condition of the transmission line, so that the unit back off time of the communication apparatus becomes a minimum necessary time. As a consequence, the communication operation can be carried out in a higher transmission efficiency.

Furthermore, since the carrier detecting unit detects the second preamble signal having the longer symbol length than that of the first preamble signal, even in such a case that the carrier detecting unit fails in the detection of the first preamble signal, the carrier detection can be carried out. As a consequence, it is possible to realize the communication apparatus capable of avoiding collisions of the carriers on the transmission line under stable manner.

The above-described communication apparatus further includes: a signal transmitting unit which transmits a signal which contains both the first preamble signal and the second preamble signal.

With employment of the above-described configuration, the carrier can be detected in a stable manner, and the communication operation with the higher transmission efficiency can be realized even in another communication apparatus.

In the above-described communication apparatus, the control unit controls the symbol length of the first preamble signal so as not to exceed the symbol length of the second preamble signal.

With employment of the above-described configuration, the symbol length of the first preamble signal is controlled within a range where this symbol does not exceed the symbol of the second preamble signal, so that the symbol length of the first preamble signal does not become redundant. As a consequence, the communication operation can be carried out in the higher transmission efficiency.

In the above-described communication apparatus, the carrier detecting unit includes: a first carrier detecting unit which detects the first preamble signal; and a second carrier detecting unit which detects the second preamble signal.

With employment of this configuration, the carrier can be detected under stable condition, and further, the communication operation can be carried out in the higher transmission efficiency.

In the above-described communication apparatus, the comparing unit compares a first detection count at which both the first carrier detecting unit and the second carrier detecting unit detect the carriers with a reference count based upon a second detection count at which only the second carrier detecting unit detects the carriers; and the control unit expands the symbol length of the first preamble signal in case that the first detection count is smaller than the reference count based upon the second detection count.

In such a case that the carrier detection counts using the first preamble signal and the second preamble signal is smaller than the reference count, it is so conceivable that the symbol length of the first preamble signal is not proper (namely, becomes short) with respect to the condition of the transmission line. With employment of this configuration, when the carrier detection counts using the first preamble signal and the second preamble signal are smaller than the reference count, since the symbol length of the short preamble is controlled to be made long, the carrier detection can be carried out in a stable manner by employing the first preamble signal. As a consequence, the unit back off time of the communication apparatus can be reduced to be the minimum necessary time, so that the communication efficiency is increased.

In the above-described communication apparatus, the comparing unit compares a third detection count at which only the first carrier detecting unit detects the carriers with a reference count based upon a second detection count at which only the second carrier detecting unit detects the carriers; and the control unit expands the symbol length of the first preamble signal in case that the third detection count is larger than or equal to the reference count based upon the second detection count.

When the carrier detection count using the first preamble signal is larger than the carrier detection count using the second preamble signal, it is so conceivable that the carrier detection using the first preamble signal is erroneously carried out. In this case, it is so conceivable that the symbol length of the first preamble signal is not proper (namely, becomes short) with respect to the condition of the transmission line. With employment of this configuration, when the carrier detection count using the first preamble signal is larger than the carrier detection count using the second preamble signal, since the symbol length of the short preamble is controlled to be made long, the carrier detection can be carried out in a stable manner by employing the first preamble signal. As a consequence, the unit back off time of the communication apparatus can be reduced to be the minimum necessary time, so that the communication efficiency is increased.

With employment of this configuration, for example, in such a case that the total error detection count using the short preamble is larger than the reference count, since the symbol length of the short preamble is made long, the carrier detection can be carried out under stable condition.

In the above-described communication apparatus, the comparing unit further compares the first detection count at which both the first carrier detecting unit and the second carrier detecting unit detect the carriers with the reference count based upon the second detection count at which only the second carrier detecting unit detects the carriers; and the control unit increases a frequency of the carrier detection by the first carrier detecting unit in case that the third detection count is smaller than the reference count based upon the second detection count, and furthermore, the first detection count is smaller than the reference count based upon the second detection count.

With employment of this configuration, for example, in such a case that the erroneous carrier detection count using the short preamble is smaller than the reference count, whereas the carrier detection count is smaller than the reference count, since the carrier detection frequency is increased, the carrier detection using the short preamble can be realized in higher probability, so that the communication operation can be performed in the higher transmission efficiency.

The above-described communication apparatus further includes: a subcarrier number control unit which decreases a number of subcarriers which construct the signal on a frequency axis based upon the symbol length of the first preamble signal and the symbol length of the second preamble signal in case that a communication modulating system performed by the communication apparatus is an OFDM (Orthogonal Frequency Division Multiplexing) system.

With employment of this arrangement, the orthogonal characteristic of the signals among the subcarriers can be maintained which are present at adjacent positions on the frequency axis, and the interference among the subcarriers can be prevented. As a result, the carriers can be detected under stable condition.

The above-described communication apparatus further includes: a unit back off time setting unit which sets a unit back off time which constitutes a base for determining a waiting time when the signal transmitting unit transmits the signal based upon the symbol length of the first preamble signal.

With employment of this configuration, since the symbol length of the short preamble is reflected on the unit back off time, the unit back off time can be set to the optimum environment under which the communication apparatus is installed. As a result, the carriers can be detected under stable condition, and also, the communication operation can be carried out in the higher transmission efficiency.

The above-described communication apparatus further includes: a judging unit which judges a condition of the transmission line based upon any one of the first preamble signal and the second preamble signal, which are detected by the carrier detecting unit; and a stopping unit for stopping that the signal transmitting unit transmits the signal for a predetermined time period based upon the judgment result of the judging unit.

With employment of this arrangement, the judging unit judges the condition of the transmission line based upon any one of the first preamble signal and the second preamble signal, which are detected by the carrier detecting unit; and the stopping unit stops that the signal transmitting unit transmits the signal for a predetermined time period based upon the judgment result of the judging unit. As a result, it is possible to avoid that the signal transmitted through the transmission line collides with the signal transmitted from the communication apparatus.

In the above-described communication apparatus, the stopping unit stops that the signal transmitting unit transmits the signal for the predetermined time period before the control unit controls the symbol length of the first preamble signal.

With employment of this configuration, it is possible to avoid that the signal transmitted through the transmission line collides with the signal transmitted from the communication apparatus.

The above-described communication apparatus further includes a demodulating unit which demodulates the first preamble signal and the second preamble signal, and the stopping unit stops that the signal transmitting unit transmits the signal for the predetermined time period based upon a modulation result obtained by the modulating unit.

With employment of this arrangement, even when the symbol lengths of the first preamble signal and the second preamble signal are changed, it is possible to stop that the signal transmitting unit transmits the signal during a proper time period. While the transmission efficiency can be improved, it is possible to avoid that the signal transmitted through the transmission line collides with the signal transmitted from the communication apparatus.

In the above-described communication apparatus, the demodulating unit demodulates the first preamble signal and the second preamble signal in case that the carrier detecting unit detects the second preamble signal.

With employment of this configuration, the signal having the higher reliability for the carrier detection can be demodulated.

In the above-described communication apparatus, the stopping unit cancels to stop that the signal transmitting unit transmits the signal for the predetermined time period in case that the carrier detecting unit detects the first preamble signal, and does not detect the second preamble signal.

With employment of this configuration, it is possible to avoid that the signal transmitted through the transmission line collides with the signal transmitted from the communication apparatus.

The above-described communication system includes a plurality of the above-described communication apparatuses, and at least one of the communication apparatuses which sets a unit back off time has been contained in these communication apparatuses.

With employment of this arrangement, in the communication system arranged by the plurality of communication apparatuses, the respective communication apparatuses can detect the carriers under stable condition, and further, the communication operation can be carried out in the higher efficiency.

In the above-described communication system, the control unit of at least one of the communication apparatuses controls the unit back off time used in the communication system based upon a unit back off time which is used by another communication apparatus and is contained in a signal whose carrier is detected by the carrier detecting unit.

With employment of this configuration, for example, the longest unit back off time used in the communication system can be set as the unit back off time in the communication system, so that all of the communication apparatuses can detect the carriers under stable condition.

In the above-described communication system, one of the communication apparatuses includes: an appliance information storage unit which stores thereinto appliance information which contains identification information for identifying other communication apparatuses, and the unit back off times which are used by the other communication apparatuses; and the control unit of the one of the communication apparatuses updates the appliance information stored in the appliance information storage unit based upon the appliance information of the other communication apparatuses, which is contained in the signal whose carrier is detected by the carrier detecting unit, and controls the unit back off time used in the communication system based upon the updated appliance information.

With employment of this arrangement, while the unit back off time of the communication apparatus whose communication frequency is low is firmly considered, the unit back off time in the communication system can be set, so that all of the communication apparatuses can detect the carriers under stable manner.

In the above-described communication system, signal transmitting unit of the communication apparatus transmits a signal which contains the unit back off time.

With employment of this arrangement, the unit back off time can be sufficiently notified to another communication apparatus, so that the carrier detections can be performed under stable condition, and the communication operation can be carried out in the higher efficiency.

In the above-described communication apparatus, a power line is employed as the transmission line.

With employment of this configuration, the carrier can be detected under stable condition, and the power line communication can be carried out in the higher transmission efficiency.

In the above-described communication apparatus, the first preamble signal and the second preamble signal are such known signals having a predetermined parameter.

Since the known signals are employed as the first preamble signal and the second preamble signal are employed, the communication apparatus can detect the carriers under stable condition. As a consequence, the communication operation can be carried out in the higher efficiency.

In the above-described communication apparatus, the predetermined parameter is a symbol length.

With employment of this configuration, the carrier can be detected under stable condition, and further, the communication operation can be carried out in the higher transmission efficiency.

In the above-described communication apparatus, the predetermined parameter is a ratio of the symbol length of the first preamble signal to the symbol length of the second preamble signal.

With employment of this configuration, the carrier can be detected under stable condition, and further, the communication operation can be carried out in the higher transmission efficiency.

In the above-described communication apparatus, the predetermined parameter is a ratio of a number of subcarriers which constitute the first preamble signal to a number of subcarriers which constitute the second preamble signal.

With employment of this configuration, the carrier can be detected under stable condition, and further, the communication operation can be carried out in the higher transmission efficiency.

In the above-described communication apparatus, the control unit prolongs the symbol length of the first preamble signal in case that the carrier detecting unit detects the second preamble signal.

When the carrier detecting unit can succeed in the carrier detection by employing the second preamble signal, the control unit controls to prolong the symbol length of the first preamble signal. As a result, the symbol length of the first preamble signal can be made to become such a symbol length suitable for the condition of the transmission line. As a consequence, since the unit back off time of the communication apparatus can be suppressed to the minimum necessary time, the communication operation can be carried out in the higher transmission efficiency.

In the above-described communication apparatus, the control unit prolongs the symbol length of the first preamble signal in case that the carrier detecting unit detects only the first preamble signal.

In such a case that the carrier detecting unit fails in the detection of the second preamble signal and can succeed only in the detection of the first preamble signal, it is so conceivable that the error detection occurs. Such a case of the error detection may be conceived as the following equivalent condition that the carrier detection cannot be performed by employing the first preamble signal due to an adverse influence caused by a deterioration of the characteristic in the transmission line. Accordingly, even when the error detection is carried out, the symbol length of the first preamble signal is controlled so as to become such a symbol length suitable for the condition of the transmission line. As a consequence, since the unit back off time of the communication apparatus can be suppressed to the minimum necessary time, the communication operation can be carried out in the higher transmission efficiency.

The present invention is usefully applied to communication systems and the like. The present invention can be applied to communication apparatuses capable of detecting carriers under stable conditions, and further, capable of executing power line communications in superior transmission efficiencies and communications by utilizing wireless LANs, and also, can be applied to a communication system which is arranged by employing these communication apparatuses. More specifically, the present invention is usefully applied to communication apparatuses and communication systems, which perform power line communications for requiring relatively long back off times.

This application is based upon and claims the benefit of priority of Japanese Patent Application No. 2007-82197 filed on Mar. 27, 2007, the contents of which is incorporated herein by references in its entirety.

What is claimed is:

1. A communication apparatus which performs a carrier detection for a frame, the frame including a first preamble signal and a second preamble signal, and is connected to a transmission line, the communication apparatus comprising:
a carrier detecting unit which detects the first preamble signal and the second preamble signal for the carrier detection in the frame respectively;
a comparing unit which provides a comparison result based on comparison of a carrier detecting result of the first preamble signal with a carrier detecting result of the second preamble signal; and
a control unit which controls a symbol length of the first preamble signal based upon the comparison result obtained by the comparing unit, wherein:
the symbol length of the first preamble signal is shorter than a symbol length of the second preamble signal, and
the first preamble signal is placed prior to the second preamble signal in a preamble field.

2. The communication apparatus as claimed in claim 1, further comprising: a signal transmitting unit which transmits a signal which contains both the first preamble signal and the second preamble signal.

3. The communication apparatus as claimed in claim 1, wherein: the control unit controls the symbol length of the first preamble signal so as not to exceed the symbol length of the second preamble signal.

4. The communication apparatus as claimed in claim 1, wherein: the carrier detecting unit includes: a first carrier detecting unit which detects the first preamble signal; and a second carrier detecting unit which detects the second preamble signal.

5. The communication apparatus as claimed in claim 4, wherein: the comparing unit compares a first detection count at which both the first carrier detecting unit and the second carrier detecting unit detect the carriers with a reference count based upon a second detection count at which only the second carrier detecting unit detects the carriers; and the control unit expands the symbol length of the first preamble signal in case that the first detection count is smaller than the reference count based upon the second detection count.

6. The communication apparatus as claimed in claim 4, wherein: the comparing unit compares a third detection count at which only the first carrier detecting unit detects the carriers with a reference count based upon a second detection count at which only the second carrier detecting unit detects the carriers; and the control unit expands the symbol length of the first preamble signal in case that the third detection count is larger than or equal to the reference count based upon the second detection count.

7. The communication apparatus as claimed in claim 6, wherein: the comparing unit further compares the first detection count at which both the first carrier detecting unit and the second carrier detecting unit detect the carriers with the reference count based upon the second detection count at which only the second carrier detecting unit detects the carriers; and the control unit increases a frequency of the carrier detection by the first carrier detecting unit in case that the third detection count is smaller than the reference count based upon the second detection count, and furthermore, the first detection count is smaller than the reference count based upon the second detection count.

8. The communication apparatus as claimed in claim 2, further comprising: a subcarrier number control unit which decreases a number of subcarriers which construct the signal on a frequency axis based upon the symbol length of the first preamble signal and the symbol length of the second preamble signal in case that a communication modulating system performed by the communication apparatus is an OFDM (Orthogonal Frequency Division Multiplexing) system.

9. The communication apparatus as claimed in claim 2, further comprising: a unit back off time setting unit which sets a unit back off time which constitutes a base for determining a waiting time when the signal transmitting unit transmits the signal based upon the symbol length of the first preamble signal.

10. The communication apparatus as claimed in claim 2, further comprising: a judging unit which judges a condition of the transmission line based upon any one of the first preamble signal and the second preamble signal, which are detected by the carrier detecting unit; and a stopping unit which stops that the signal transmitting unit transmits the signal for a predetermined time period based upon the judgment result of the judging unit.

11. The communication apparatus as claimed in claim 10, wherein: the stopping unit stops that the signal transmitting unit transmits the signal for the predetermined time period before the control unit controls the symbol length of the first preamble signal.

12. The communication apparatus as claimed in claim 10, further comprising: a demodulating unit which demodulates the first preamble signal and the second preamble signal; and wherein: the stopping unit stops that the signal transmitting unit transmits the signal for the predetermined time period based upon a modulation result obtained by the modulating unit.

13. The communication apparatus as claimed in claim 12, wherein: the demodulating unit demodulates the first preamble signal and the second preamble signal in case that the carrier detecting unit detects the second preamble signal.

14. The communication apparatus as claimed in claim 13, wherein: the stopping unit cancels to stop that the signal transmitting unit transmits the signal for the predetermined time period in case that the carrier detecting unit detects the first preamble signal, and does not detect the second preamble signal.

15. A communication system, comprising: a plurality of the communication apparatuses recited in claim 1; wherein: at least one of the communication apparatuses further includes: a signal transmitting unit which transmits a signal which contains both the first preamble signal and the second preamble signal; and a unit back off time setting unit which sets a unit back off time which constitutes a base for determining a waiting time when the signal transmitting unit transmits the signal based upon the symbol length of the first preamble signal.

16. The communication system as claimed in claim 15, wherein: the control unit of at least one of the communication apparatuses controls the unit back off time used in the communication system based upon a unit back off time which is used by another communication apparatus and is contained in a signal whose carrier is detected by the carrier detecting unit.

17. The communication system as claimed in claim 15, wherein: one of the communication apparatuses includes an appliance information storage unit which stores thereinto appliance information which contains identification information for identifying other communication apparatuses and the unit back off times which are used by the other communication apparatuses; and the control unit of the one of the communication apparatuses updates the appliance information stored in the appliance information storage unit based upon the appliance information of the other communication apparatuses, which is contained in the signal whose carrier is detected by the carrier detecting unit, and controls the unit back off time used in the communication system based upon the updated appliance information.

18. The communication system as claimed in claim 16, wherein: the signal transmitting unit of the communication apparatus transmits a signal which contains the unit back off time.

19. A communication control method, comprising:
carrying out a carrier detection for a frame, the frame including a first preamble signal and a second preamble signal, by employing the first preamble signal for the carrier detection and the second preamble signal for the carrier detection in the frame respectively;
comparing a carrier detecting result of the first preamble signal with a carrier detection result of the second preamble signal to provide a comparison result; and
controlling at least one of a symbol length of the first preamble signal and a symbol length of the second preamble signal based upon the comparison result, wherein:
the symbol length of the first preamble signal is shorter than a symbol length of the second preamble signal, and
the first preamble signal is placed prior to the second preamble signal in a preamble field.

20. The communication apparatus as claimed in claim 1, wherein: the transmission line is a power line.

21. An integrated circuit which performs a carrier detection for a frame, the frame including a first preamble signal and a second preamble signal, the integrated circuit comprising:

a carrier detecting unit which detects the first preamble signal and the second preamble signal for the carrier detection in the frame respectively;

a comparing unit which provides a comparison result based on comparison of a carrier detecting result of the first preamble signal with a carrier detecting result of the second preamble signal; and a control unit which controls a symbol length of the first preamble signal based upon the comparison result obtained by the comparing unit, wherein:

the symbol length of the first preamble signal is shorter than a symbol length of the second preamble signal, and the first preamble signal is placed prior to the second preamble signal in a preamble field.

22. The communication apparatus as claimed in claim 1, wherein: the first preamble signal and the second preamble signal are known signals having a predetermined parameter.

23. The communication apparatus as claimed in claim 22, wherein: the predetermined parameter is a symbol length.

24. The communication apparatus as claimed in claim 22, wherein: the predetermined parameter is a ratio of the symbol length of the first preamble signal to the symbol length of the second preamble signal.

25. The communication apparatus as claimed in claim 22, wherein: the predetermined parameter is a ratio of a number of subcarriers which constitute the first preamble signal to a number of subcarriers which constitute the second preamble signal.

26. The communication apparatus as claimed in claim 1, wherein: the control unit prolongs the symbol length of the first preamble signal in case that the carrier detecting unit detects the second preamble signal.

27. The communication apparatus as claimed in claim 1, wherein: the control unit prolongs the symbol length of the first preamble signal in case that the carrier detecting unit detects only the first preamble signal.

* * * * *